US008566260B2

(12) United States Patent
Suzuki et al.

(10) Patent No.: US 8,566,260 B2
(45) Date of Patent: Oct. 22, 2013

(54) STRUCTURED PREDICTION MODEL LEARNING APPARATUS, METHOD, PROGRAM, AND RECORDING MEDIUM

(75) Inventors: Jun Suzuki, Kyoto (JP); Michael J. Collins, Cambridge, MA (US)

(73) Assignees: Nippon Telegraph and Telephone Corporation, Tokyo (JP); Massachusetts Institute of Technology, Cambridge, MA (US)

( * ) Notice: Subject to any disclaimer, the term of this patent is extended or adjusted under 35 U.S.C. 154(b) by 279 days.

(21) Appl. No.: 12/895,014

(22) Filed: Sep. 30, 2010

(65) Prior Publication Data

US 2012/0084235 A1   Apr. 5, 2012

(51) Int. Cl.
 G06F 15/18 (2006.01)
(52) U.S. Cl.
 USPC .......................................................... 706/12
(58) Field of Classification Search
 USPC ............... 706/12, 55, FOR. 123, FOR. 109, 706/FOR. 106
 See application file for complete search history.

(56) References Cited

U.S. PATENT DOCUMENTS

| 7,953,676 | B2 * | 5/2011 | Agarwal et al. .................. 706/12 |
| 7,970,767 | B2 * | 6/2011 | Probst et al. .................... 707/739 |
| 8,010,357 | B2 * | 8/2011 | Hakkani-Tur et al. ......... 704/244 |
| 8,234,228 | B2 * | 7/2012 | Weston et al. ................... 706/20 |
| 2007/0239642 | A1 | 10/2007 | Sindhwani et al. .............. 706/25 |
| 2007/0282892 | A1 * | 12/2007 | Probst et al. .................... 707/102 |
| 2011/0231350 | A1 * | 9/2011 | Momma et al. .................. 706/12 |
| 2011/0246467 | A1 * | 10/2011 | Probst et al. .................... 707/739 |
| 2011/0270604 | A1 * | 11/2011 | Qi et al. .............................. 704/9 |

FOREIGN PATENT DOCUMENTS

JP   2008-225907   9/2008

OTHER PUBLICATIONS

An Empirical Study of Semi-supervised Structured Conditional Models for Dependency Parsing, by Suzuki et al., Aug. 2009.*
Maximum Entropy Distribution Estimation with Generalized Regularization, by Dudic et al., Dec. 2006.*
Semi-Supervised Structured Output Learning based on a Hybrid Generative and Discriminitive Approach, Jun. 2007.*
Logistic Regression, AdaBoost and Bregman Distances, by Collins et al., Dec. 2002.*
Clustering with Bregman Divergences, A. Banerjee, S. Merugu, I. S. Dhillon, J. Ghosh, The Journal of Machine Learning Research, vol. 6, Dec. 2005.*
Dong C. Liu, et al., "On the Limited Memory BFGS Method for Large Scale Optimization", Mathematical Programming vol. 45, issue 3, 1989, pp. 503-528.

(Continued)

*Primary Examiner* — Jeffrey A Gaffin
*Assistant Examiner* — Thomas Fink
(74) *Attorney, Agent, or Firm* — Oblon, Spivak, McClelland, Maier & Neustadt, L.L.P.

(57) ABSTRACT

A structured prediction model learning apparatus, method, program, and recording medium maintain prediction performance with a smaller amount of memory. An auxiliary model is introduced by defining the auxiliary model parameter set $\theta^{(k)}$ with a log-linear model. A set $\Theta$ of auxiliary model parameter sets which minimizes the Bregman divergence between the auxiliary model and a reference function indicating the degree of pseudo accuracy is estimated by using unsupervised data. A base-model parameter set $\lambda$ which minimizes an empirical risk function defined beforehand is estimated by using supervised data and the set $\Theta$ of auxiliary model parameter sets.

13 Claims, 21 Drawing Sheets

(56) References Cited

OTHER PUBLICATIONS

Notification of Reasons for Refusal issued Jan. 8, 2013 in Japanese Patent Application No. 2011-094028 (with English translation).
Yu Fujimoto, et al., "A modified EM algorithm for mixture models based on Bregman Divergence", Dec. 16, 2006, URL: http://www.ism.ac.jp/editsec/aism/pdf/059_1_0003.pdf.
Jun Suzuki, et al., "Semi-Supervised Swquential Labeling and Segmentation Using Giga-word Scale Unlabeled Data", Prodeedings of ACL-08, Jun. 2008, pp. 665-673.

John Lafferty, et al., "Conditional Random Fields: Probabilistic Models for Segmenting and Labeling Sequence Data", Proceeding of the Eighteenth International Conference on Machine Learning, 2001, pp. 282-289.
Fei Sha, et al., "Shallow Parsing with Conditional Random Fields", Proceedings of HTL-NAACL, 2003, pp. 134-141.
Dong C. Liu, et al., "On the Limited Memory BFGS Method for Large Scale Optimization", Mathematical Programming vol. 45, issue 3, 1989, pp. 503- 528.

* cited by examiner

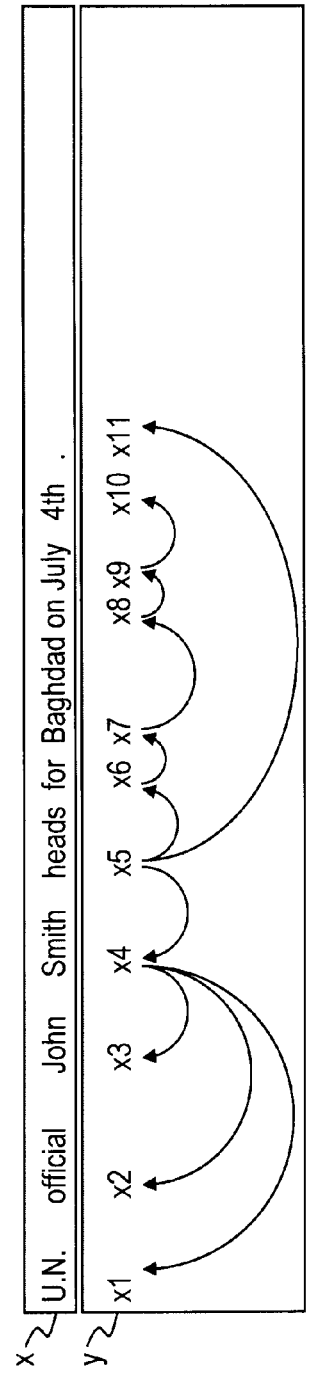

FIG.7

$x^{(1)}$: U.N. official John Smith heads for Baghdad on July 4th .
$y^{(1)}$: ORG. O PER. PER. O O LOC. O O DATE DATE O

...

$x^{(N)}$: Ichiro is one of the famous Japanese in U.S.
$y^{(N)}$: PER. O O O O O O LOC.

FIG.8

$x^{(1)}$: The new real estate unit would have a separate capital structure .

...

$x^{(M)}$: The reaction to do nothing and ride it out .

FIG.9

$T_1$: PER., ORG., DATE, LOC., O

FIG.13

| FEATURE | FEATURE VECTOR |
|---|---|
| ... | ... |
| $y_i$=PER. & $x_{i-2}$=O | 1 |
| $y_i$=PER. & $x_{i-1}$=O | 1 |
| $y_i$=PER. & $x_i$=John | 1 |
| $y_i$=PER. & $x_{i+1}$=was | 1 |
| $y_i$=PER. & $x_{i+2}$=invited | 1 |
| ... | ... |
| $y_i$=PER. & $x_{i+1}$=was & $x_{i+2}$=invited | 1 |
| ... | ... |
| $y_i$=ORG. & $x_{i-2}$=John | 0 |
| $y_i$=ORG. & $x_{i-1}$=was | 0 |
| $y_i$=ORG. & $x_i$=invited | 0 |
| $y_i$=ORG. & $x_{i+1}$=to | 0 |
| $y_i$=ORG. & $x_{i+2}$=Tokyo | 0 |
| ... | ... |
| $y_i$=ORG. & $x_{i+1}$=to & $x_{i+2}$=Tokyo | 0 |
| ... | ... |

FIG.14

| FEATURE | FEATURE VECTOR |
|---|---|
| ... | ... |
| $y_i$=PER. & $x_{i-2}$=O | 0 |
| $y_i$=PER. & $x_{i-1}$=O | 0 |
| $y_i$=PER. & $x_i$=John | 0 |
| $y_i$=PER. & $x_{i+1}$=was | 0 |
| $y_i$=PER. & $x_{i+2}$=invited | 0 |
| ... | ... |
| $y_i$=PER. & $x_{i+1}$=was & $x_{i+2}$=invited | 0 |
| ... | ... |
| $y_i$=ORG. & $x_{i-2}$=John | 1 |
| $y_i$=ORG. & $x_{i-1}$=was | 1 |
| $y_i$=ORG. & $x_i$=invited | 1 |
| $y_i$=ORG. & $x_{i+1}$=to | 1 |
| $y_i$=ORG. & $x_{i+2}$=Tokyo | 1 |
| ... | ... |
| $y_i$=ORG. & $x_{i+1}$=to & $x_{i+2}$=Tokyo | 1 |
| ... | ... |

…

STRUCTURED PREDICTION MODEL LEARNING APPARATUS, METHOD, PROGRAM, AND RECORDING MEDIUM

TECHNICAL FIELD

The present invention relates to methods of machine learning, and more specifically, to an apparatus, method, program, and recording medium for learning a structured prediction model used in a structured prediction system that predicts an output structure with respect to an input structure written by a discrete structure (a so-called graph). Machine learning is a technology for learning (extracting) useful regularity, knowledge representations, criteria, and the like from data prepared in advance for learning.

BACKGROUND ART

The problem of predicting a structure hidden behind certain information is called a structured prediction problem. An apparatus (or program) for predicting an output structure with respect to an input structure is called a structured prediction system. The input structure and the output structure are certain discrete structures, and the structures can be expressed by so-called graphs (structures constructed by a set of nodes and a set of edges). The input and output structures can further be expressed by a labeled graph (a graph with label at nodes and/or edges). A model used in the structured prediction system is called a structured prediction model. The structured prediction model is used to predict the likeliest output structure with respect to the input structure.

Structured prediction problems in the real world include the following, for example: (1) the problem of predicting a grammatical or semantic structure from text data; (2) the problem of predicting a protein structure from genetic sequence data; (3) the problem of predicting (recognizing) an object included in image data; and (4) the problem of predicting a network structure from data expressing person-to-person relations or object-to-object relations.

Some problems (such as the problems (1) to (4) listed above) in the real world processed on a computer can be formulated as structured prediction problems when they are converted into such a form that the computer can easily handle. Examples are shown in FIGS. 1 to 3. In the mathematical expression, here, the input structure is denoted by x, and the output structure is denoted by y. The input structure x is one element of a set X of all possible inputs, or x∈X. The output structure y is one element of a set Y of all possible outputs, or y∈Y. Since the output structure y depends on the input structure x, y is one element of a set Y(x) of all possible outputs with respect to x, or y∈Y(x). In addition, Y(x)⊂Y.

FIG. 1 shows a sequence structured prediction problem of extracting a named entity from English-language text. In the figure, a proper noun is given a label indicating the type of the proper noun.

The shown input structure x, "U.N. official John Smith heads for Baghdad on July 4th." is segmented into eleven tokens (or words). Six tokens "U.N.", "John", "Smith", "Baghdad", "July", and "4th" are labeled ORG., PER., PER., LOC., DATE, and DATE respectively: PER. stands for a person name, LOC. stands for a location name, and ORG. stands for an organization name.

FIG. 2 shows a tree-structure prediction problem for analyzing the dependency structure in English-language text. FIG. 2 shows an example of assigning labels indicating grammatical linking relationships to tokens (or words). The input sequence x, "U.N. official John Smith heads for Baghdad on July 4th." is tokenized into eleven units. Each token is given a label indicating a grammatical linking relationship: The label given to "U.N." has a link from "Smith" ("x1←x4"); the label given to "official" has a link from "Smith" ("x2←4"); the label given to "John" has a link from "Smith" ("x3←4"); the label given to "Smith" has a link from "heads" ("x4←5"); the label given to "heads" has no link since "heads" is the head word of this sentence; the label given to "for" has a link from "heads" ("x6→x7"); the label given to "Baghdad" has a link from "for" ("x7→x8"); the label given to "on" has a link from "Baghdad" ("x8→x9"); the label given to "July" has a link from "on" ("x9→x10"); the label given to "4th" has a link from "July" ("x10→x11"); and the label given to "." has a link from "heads" ("x11←x5").

FIG. 3A shows a sequence structured prediction problem of estimating a gene region from a DNA base sequence. Base sequences (codons) which consist of three bases with four kinds, T, C, A, G, are given labels representing amino acids: The codon "ATG" is labeled "M", which stands for the amino acid Methionine; the codon "TGA" is labeled "H", which stands for the amino acid Histidine; the codons between "ATG" and "TGA" are labeled "R", "D", "W", and "Q"; letters before "ATG" and letters after "TGA" are labeled "O" to indicate that there are no corresponding amino acids. The label "M" indicates the start codon of protein translation and the label "H" indicates the stop codon of protein translation.

FIG. 3B shows a problem of predicting a network structure from data expressing person-to-person relations or object-to-object relations. In the shown example, the input structure is combinations of a person's name and the person's purchasing history of certain products, and each person is labeled the name of a different person having the same preference. The shown input structure is: (Smith, (A, B, E)), (Johnson, (F, G, J)), (Williams, (A, C, D)), (Brown, (A, B, C, D, E)), (Jones, (A, C, D)), (Miller, (D, F, G, J)), (Davis, (A, F, G, H, J)). Each node (person's name) is given a label indicating a person having the same preference: Smith is labeled Brown; Johnson is labeled Miller, Davis; Williams is labeled Brown, Jones; Brown is labeled Smith, Williams, Jones; Jones is labeled Williams, Brown; Miller is labeled Johnson, Davis; and Davis is labeled Johnson, Miller.

One choice of the prediction of a correct output structure with respect to an input structure is to make use of the structured prediction model made by machine learning method. Methods for learning structured prediction models which structured prediction systems use in machine learning are generally classified into three major groups. A first type of learning uses so-called supervised data, which indicates a correct output structure with respect to an input structure. This method is called supervised learning since the data is used as a supervised signal. The supervised signal is an output structure considered to be ideal for a given input structure. Here, the supervised data is given as a set of combinations of an input structure and a supervised signal (ideal output structure). Supervised data having J samples is expressed as $$D_L = \{(x^{(j)}, y^{(j)})\}_{j=1}^{J}$$

An advantage of supervised learning based on supervised data is a high-performance structured prediction model can be learned. A difficulty of predicting (estimating) an output structure is the output structure y has interdependent relations that can be expressed by a labeled graph. Accordingly, the relation in the entire output structure should be considered when the data is created. Expert knowledge about the task is needed in many cases. The cost of creating a large amount of supervised data required to learn the structured prediction model is extremely high in terms of manpower, time, and expense. The performance of supervised learning depends largely on the amount of supervised data. If a sufficient amount of supervised data cannot be prepared, the performance of the structured prediction model obtained by supervised learning with the supervised data would be low.

A second type of learning is unsupervised learning, which uses data without a known output structure (hereafter unsupervised data) alone. Unsupervised learning is superior to supervised learning in that there is no need to worry about the cost of creating supervised data. Unsupervised learning, however, requires some types of prior knowledge, such as a hypothesis and similarity measure between input structures, to provide sufficient prediction performance. If the prior knowledge is not known or hard to implement into computer, the structured prediction model obtained from unsupervised learning does not provide sufficient prediction performance. Generally, since it is often hard to implement the prior knowledge in computer, structured prediction models obtained from unsupervised learning often have lower prediction performance than those obtained from supervised learning.

A third type of learning is semi-supervised learning, which uses both supervised data and unsupervised data. Semi-supervised learning is a method of improving the prediction performance of supervised learning by using together with unsupervised data when the amount of supervised data is limited. Therefore, semi-supervised learning has a possibility to provide a high-performance structured prediction model at low cost.

One known method of learning a structured prediction model by semi-supervised learning is described in J. Suzuki and H. Isozaki, "Semi-Supervised Sequential Labeling and Segmentation Using Giga-word Scale Unlabeled Data", Proceedings of ACL-08, 2008, pp. 665-673 (hereafter non-patent literature 1). This method is obtained by extending supervised learning of a structured prediction model called a conditional random field (refer to J. Lafferty, A. McCallum, F. Pereira, "Conditional Random Fields: Probabilistic Models for Segmenting and Labeling Sequence Data", Proceedings of 18th International Conf. on Machine Learning, 2001, pp. 282-289), to semi-supervised learning. The structured prediction system using the structured prediction model learned in this method shows very good prediction performance with real data.

SUMMARY OF THE INVENTION

A limited amount of supervised data can be used in most cases because of the high creation cost. As described earlier, if a sufficient amount of supervised data cannot be used for a structured prediction problem, the structured prediction model obtained from supervised learning does not provide sufficient prediction performance.

In comparison with supervised data, a larger amount of unsupervised data can be obtained more easily. However, it is essentially difficult to obtain sufficient prediction performance from the structured prediction model learned in unsupervised learning as described earlier.

It is ideal to learn a structured prediction model in semi-supervised learning, which uses a small amount of supervised data and a large amount of unsupervised data.

Since the output structure y is not known in the unsupervised data, when the input structure x is given directly, the conditional probability p(y|x) of the output structure y cannot be estimated in learning of the structured prediction model. Therefore, it has been proposed in Japanese Patent Application Laid Open No. 2008-225907 and non-patent literature 1 to estimate an output structure by using a model generated with a joint probability p(x, y). Generally, in semi-supervised learning, if supervised data that can be used in learning of the structured prediction model is limited, an enormous amount of unsupervised data is required to obtain sufficient prediction performance. The structured prediction model obtained from the enormous amount of unsupervised data would be complicated. The complicated structured prediction model requires a large storage area in the structured prediction model creating apparatus and the structured prediction system. This can lower the prediction speed of the structured prediction system.

Accordingly, it is an object of the present invention to provide an apparatus, method, program, and recording medium for learning a structured prediction model with a reduced memory space while maintaining prediction performance.

To solve the above-described problems, in the structured prediction model learning technology according to the present invention, a structured prediction model used to predict an output structure y corresponding to an input structure x is learned, by using supervised data $D_L$ and unsupervised data $D_U$. In the structured prediction model learning technology according to the present invention, a supervised data output candidate graph for the supervised data and an unsupervised data output candidate graph for the unsupervised data are generated by using a set of definition data for generating output candidates identified by a structured prediction problem; features are extracted from the supervised data output candidate graph and the unsupervised data output candidate graph by using a feature extraction template, a D-dimensional base-model feature vector $f_{x,y}$ corresponding to a set of the features extracted from the supervised data output candidate graph is generated, a set of the features extracted from the unsupervised data output candidate graph is divided into K subsets, and a $D_k$-dimensional auxiliary model feature vector $g^{(k)}_{x,y}$ corresponding to features included in a subset k of the K subsets is generated, where K is a natural number and k∈{1, 2, . . . , K}; a base-model parameter set λ which includes a first parameter set w formed of D first parameters in one-to-one correspondence with D elements of the base-model feature vector $f_{x,y}$ is generated, an auxiliary model parameter set $\theta^{(k)}$ formed of $D_k$ auxiliary model parameters in one-to-one correspondence with $D_k$ elements of the auxiliary model feature vector $g^{(k)}_{x,y}$ is generated, and a set $\Theta = \{\theta^{(1)}, \theta^{(2)}, \ldots, \theta^{(K)}\}$ of auxiliary model parameter sets, formed of K auxiliary model parameter sets $\theta^{(k)}$ is generated; a set Θ of auxiliary model parameter sets which minimizes the Bregman divergence having a regularization term obtained from the auxiliary model parameter set $\theta^{(k)}$, between each auxiliary model $q_k$ and a reference function r̃(x, y) which is a nonnegative function and indicates the degree of pseudo accuracy of the output structure y corresponding to the input structure x is estimated by using the regularization term and the unsupervised data $D_U$, where the auxiliary model $q_k$ is obtained by defining the auxiliary model parameter set $\theta^{(k)}$ with a log-linear model; and a base-model parameter set λ which minimizes an empirical risk function defined beforehand is estimated by using the supervised data $D_L$ and the set Θ of auxiliary model parameter sets, where the base-model parameter set λ includes a second parameter set v={$v_1, v_2, \ldots, v_K$} formed of K second parameters in one-to-one correspondence with K auxiliary models.

EFFECTS OF THE INVENTION

In the present invention, unsupervised data is used to estimate auxiliary model parameters that minimize the Bregman divergence between a reference function indicating the degree of pseudo accuracy and the auxiliary model. With such a configuration, it becomes possible to approximately estimate a correct solution of the unsupervised data, whose correct solution is unknown, and use the solution. Even with a small amount of supervised data, which is expensive in terms of the cost of generation, unsupervised data, which is inexpensive in terms of the cost of generation, is additionally used to allow a structured prediction model to be learned, and further to allow the prediction performance of the structured prediction model to be improved. In the present invention, by defining auxiliary models with log-linear models or the like, the technology of $L_1$ norm regularization can be introduced when minimizing the Bregman divergence. By introducing the technology of $L_1$ norm regularization, the number of parameters which are active (in other words, non-zero parameters) can be reduced. With such a configuration, it is possible to systematically reduce the required amount of memory for the structured prediction model without any special processing.

In addition, with the use of such a structured prediction model, the amount of memory required for the structured prediction system can be reduced. Therefore, the time required to load the structured prediction model from an external storage device such as an HDD to the main memory can be reduced. Further, the index retrieval speed for features is increased, reducing the time for structured prediction.

BRIEF DESCRIPTION OF THE DRAWINGS

FIG. 1 shows a sequence structured prediction problem of extracting a named entity from English-language text;

FIG. 2 shows a tree-structure prediction problem of analyzing the dependency structure in English-language text;

FIG. 7 shows English-language supervised data;

FIG. 8 shows English-language unsupervised data;

FIG. 9 shows a set $T_1$ of definition data for output candidate generation;

FIG. 13 shows an example of a feature vector assigned to a node 411 shown in FIG. 12;

FIG. 14 shows an example of a feature vector assigned to a node 412 shown in FIG. 12;

DETAILED DESCRIPTION OF THE EMBODIMENTS

Outline of Present Invention

Figures 3A, 3B:
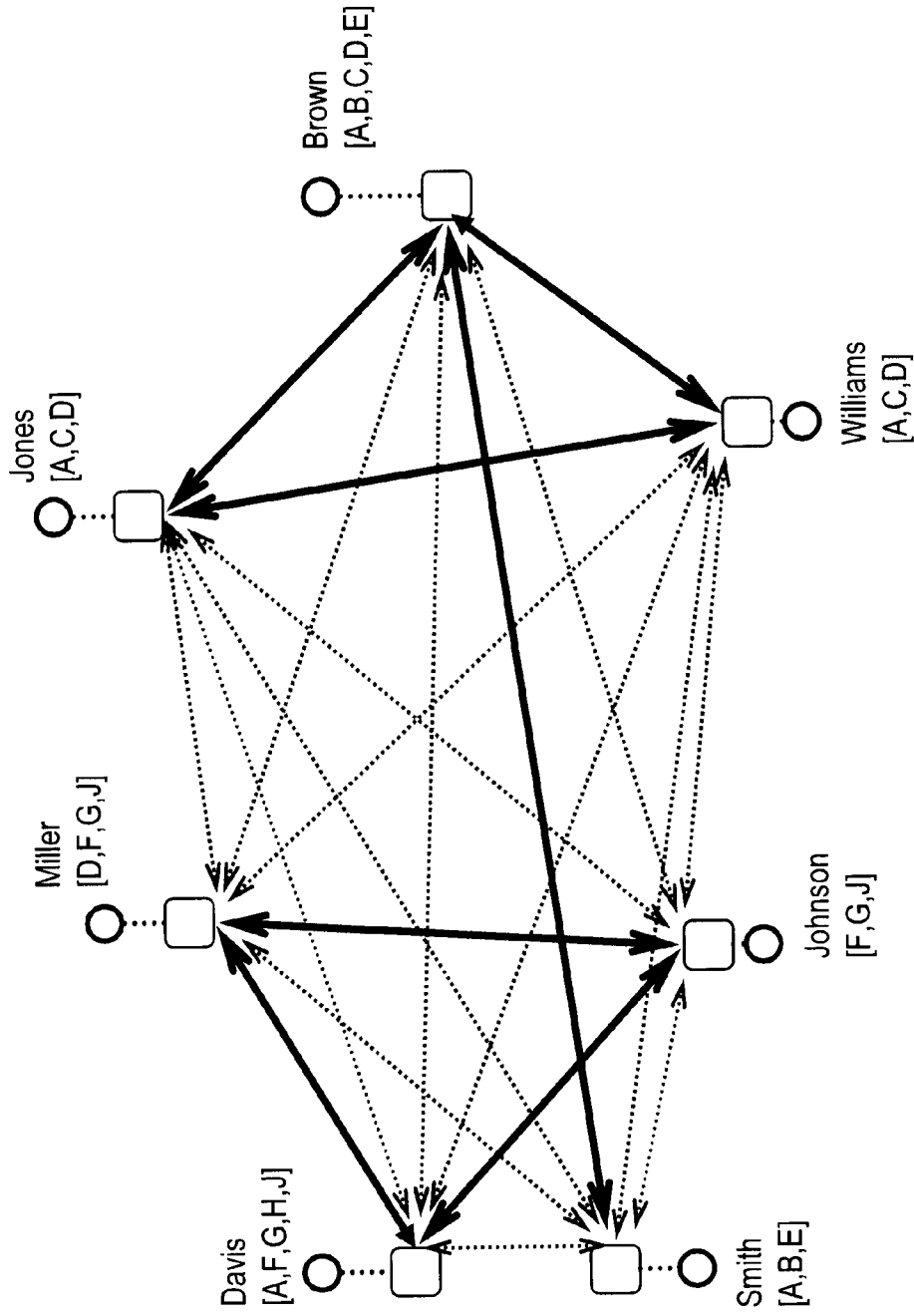
FIG. 3A shows a sequence structured prediction problem of estimating a gene region from a DNA base sequence.
FIG. 3B shows a problem of predicting a network structure from data expressing person-to-person relations or object-to-object relations.

A structured prediction model predicts an output structure y with respect to an input structure x. In an example of the present invention, the structured prediction model is defined by the equation given below:

$$\hat{y} = \arg\max_{y \in Y(x)} d(x, y; \lambda, \Theta) \quad (1)$$

$$d(x, y; \lambda, \Theta) = w \cdot f_{x,y} + \sum_{k=1}^{K} v_k \theta^{(k)} \cdot g^{(k)}_{x,y}$$

Equation (1) means that a structure is predicted by using a score corresponding to features extracted from a combination of the input structure x and the output structure y. Equation (1) provides the result of prediction, supposing that an output structure ŷ having the highest total score for the features is the likeliest output structure with respect to the input structure x. Here, $d(x, y; \lambda, \Theta)$ represents a discriminant function that returns a score indicating the likelihood of obtaining the output structure y with respect to the input structure x. The return value of $d(x, y; \lambda, \Theta)$ is a real value. $d(x, y)$ calculates a predetermined expression, by using a base-model parameter set λ and a set Θ of auxiliary model parameter sets, which will be described later. Here, $\lambda = \{w, v_1, v_2, \ldots, v_K\}$ and $\Theta = \{\theta^{(1)}, \theta^{(2)}, \ldots, \theta^{(K)}\}$. $f_{x,y}$ represents a D-dimensional base-model feature vector with respect to the set of features extracted from supervised data $D_L$. w denotes a first parameter set formed of D first parameters in one-to-one correspondence with D elements of the base-model feature vector $f_{x,y}$. $g^{(k)}_{x,y}$ denotes a $D_k$-dimensional auxiliary model feature vector corresponding to the set of features included in a subset k obtained when the set of features extracted from unsupervised data $D_L$ is divided into K subsets. $\theta^{(k)}$ denotes an auxiliary model parameter set including $D_k$ auxiliary model parameters in one-to-one correspondence with $D_k$ elements of the feature vector $g^{(k)}_{x,y}$. $v = \{v_1, v_2, \ldots, v_K\}$ is a second parameter set formed of K second parameters in one-to-one correspondence with K auxiliary models. K is a natural number, and $k \in \{1, 2, \ldots, K\}$. The base-model is used to estimate a base-model parameter set λ used in the discriminant function, by using the supervised data $D_L$. The auxiliary model is used to estimate the set $\Theta$ of auxiliary model parameter sets used in the discriminant function, by using the unsupervised data $D_U$. How to obtain the parameters and vectors will be described later.

An Auxiliary Model

If the structured prediction model is learned with unsupervised data, since the output structure y is not known, the structured prediction model cannot be learned by using the output structure y obtained with respect to the input structure x. According to an example of the present invention, a correct output structure y is approximated by using K auxiliary models. The auxiliary model is defined as a nonnegative function. For example, a logistic regression model or a log-linear model can be used as the auxiliary model. The set $\Theta$ of auxiliary model parameter sets is estimated to minimize the Bregman divergence between the auxiliary model and a given reference function. To reduce the storage space of the structured prediction model, an $L_1$ norm regularization term is used. This allows the optimum set $\Theta$ of parameter sets to be estimated while the number of non-zero parameters is minimized.

Local Structure

In Equation (1), the total number of output structure candidates Y(x) with respect to the input structure x is generally very large. Since the calculation cost would be too large in many cases, it would be difficult to enumerate all the possible output candidates in Y(x). To reduce the calculation cost, a method for decomposing an output structure y by local structures (sub-structures) z can be used. In this situation, the global features of an entire output structure y are not allowed to use, and features obtained only from local structures z can be used for prediction.

The local structures should be defined manually but can be defined freely in advance in accordance with the target problem. For example, they are defined by cliques of the output structure graph in general. However, it is not necessary to define a local structure by segmenting the elements of the output structure exclusively. The local structures may also be defined in such a manner that a local structure completely includes another local structure.

A set of all local structures that can be obtained from an output structure y in accordance with its predefinition is denoted by Z(x, y). An element of the local structure set Z(x, y) is denoted by z∈Z(x, y). A set of all local structures included in the set Y(x) of all output candidates generated from x is denoted by Z(x, Y(x)).

A feature vector extracted from the information of a given input structure x and a certain local structure z will be denoted by $f_{x,z}$ or $g^{(k)}_{x,y}$. Suppose that the following equations hold in an example of the present invention.

$$f_{x,y} = \sum_{z \in Z(x,y)} f_{x,z} \quad (2)$$

$$g^{(k)}x, y = \sum_{z \in Z(x,y)} g^{(k)}_{x,z} \quad (3)$$

Equation (2) means that the total of feature vectors $f_{x,z}$ obtained from the local structures z becomes the feature vector $f_{x,y}$ of the entire output structure. Equation (3) means that the total of feature vectors $g^{(k)}_{x,z}$ obtained from the local structures z becomes the feature vector $g^{(k)}_{x,y}$ of the entire output structure. Equation (1) can be expressed by Equation (1)' below.

$$\hat{y} = \arg\max_{y \in Y(x)} d(x, y; \lambda, \Theta) \quad (1)'$$

$$d(x, y; \lambda, \Theta) = w \cdot f_{x,y} + \sum_{k=1}^{K} v_k \theta^{(k)} \cdot g^{(k)}_{x,y}$$

$$= \sum_{z \in Z(x,y)} w \cdot f_{x,z} + \sum_{k=1}^{K} \sum_{z \in Z(x,y)} v_k \theta^{(k)} \cdot g^{(k)}_{x,z}$$

A base-model P and an auxiliary model $q_k$ will be defined next, where $q_k$ stands for a k-th auxiliary model. Three types of auxiliary models will be described below. Any type of auxiliary model is a nonnegative function, and the auxiliary model parameter set $\theta^{(k)}$ is defined by a log-linear model.

Auxiliary Model of Type 1

A k-th auxiliary model of type 1 is denoted by $q^1_k$. A conditional probability q(y|x) that an output structure y is output with respect to x and a conditional probability q(¬y|x)=1−q(y|x) of the opposite are expressed by the following equations.

$$q^1_k(y \mid x; \theta^{(k)}) = \frac{\exp[\theta^{(k)} \cdot g^{(k)}_{x,y}]}{b(y) + \exp[\theta^{(k)} \cdot g^{(k)}_{x,y}]} \quad (4)$$

$$q^1_k(\neg y \mid x; \theta^{(k)}) = 1 - q^1_k(y \mid x; \theta^{(k)})$$

$$= \frac{b(y)}{b(y) + \exp[\theta^{(k)} \cdot g^{(k)}_{x,y}]}$$

Here, $b(y) = \sum_z b(z)$ is a function that returns a value more or equals to 1. b(y) is assigned such a value that Equation (4) matches with a uniform distribution when $\theta^{(k)} \cdot g^{(k)}_{x,y} = 0$. Next, $q'^1_k$ will be defined by using the odds for $q^1_k$.

$$q'^1_k(y \mid x; \theta^{(k)}) = \text{odds}(q^1_k) \quad (5)$$

$$= \frac{q^1_k(y \mid x; \theta^{(k)})}{q^1_k(\neg y \mid x; \theta^{(k)})}$$

$$= \frac{\exp[\theta^{(k)} \cdot g^{(k)}_{x,y}]}{b(y)}$$

$$\propto q^1_k(y \mid x; \theta^{(k)})$$

Therefore, $q'^1_k$ has a value of $q^1_k$ multiplying by 1/b(y). Namely, $q'^1_k$ is proportional to $q^1_k$.

For the subsequent processing, $Q_k$ is defined as follows.

$$Q_k(z \mid x; \theta^{(k)}) = q'^1_k(z \mid x, \theta^{(k)}) \quad (6)$$

Here, $q'^1_k(z|x, \theta^{(k)})$ represents the conditional probability that the local structure z appears in the output structure y obtained with respect to x. This conditional probability can be calculated as a marginal probability of z from the definition of $q'^1_k(y|x, \theta^{(k)})$.

Auxiliary Model of Type 2

An auxiliary model of type 2 is denoted by $q^2_k$. The auxiliary model $q^2_k$ uses a simpler structure to reduce the calculation cost. It does not model the output structure y obtained with respect to the input structure x, but the local structures z in the output structure y. A conditional probability q(z|x) of the local structure z in the output structure y, given the input structure x, and a conditional probability q(¬z|x)=1−q(z|x) are expressed by the equations given below.

$$q_k^2(z \mid x; \theta^{(k)}) = \frac{\exp[\theta^{(k)} \cdot g_{x,z}^{(k)}]}{b(z) + \exp[\theta^{(k)} \cdot g_{x,z}^{(k)}]} \quad (7)$$

$$q_k^2(\neg z \mid x; \theta^{(k)}) = 1 - \frac{\exp[\theta^{(k)} \cdot g_{x,z}^{(k)}]}{b(z) + \exp[\theta^{(k)} \cdot g_{x,z}^{(k)}]}$$

$$= \frac{b(z)}{b(z) + \exp[\theta^{(k)} \cdot g_{x,z}^{(k)}]}$$

Here, b(z) represents the number of local structures that are rival candidates of the local structure z. This means that b(z) is a correction term such that the probability of appearance of z matches the probability of a rival candidate as shown below if $\theta^{(k)} \cdot g_{x,z}^{(k)} = 0$ is the default value.

$$\frac{1}{b(z)+1} = \overline{p}(z \mid x)$$

Next, $q'^2_k$ is defined as follows, by using the odds for $q^2_k$.

$$q_k'^2(z \mid x; \theta^{(k)}) = \mathrm{odds}(q_k^2) \quad (8)$$

$$= \frac{q_k^2(z \mid x; \theta^{(k)})}{q_k^2(\neg z \mid x; \theta^{(k)})}$$

$$= \frac{\exp[\theta^{(k)} \cdot g^{(k)}(x, z)]}{b(z)}$$

$$\propto q_k^2(z \mid x; \theta^{(k)})$$

For the subsequent processing, $Q_k$ is defined as follows.

$$Q_k(z \mid x; \theta^{(k)}) = b(z)\mathrm{odds}(q_k^2) \quad (9)$$

$$= b(z) q_k'^2$$

$$= \exp[\theta^{(k)} \cdot g_{x,z}^{(k)}]$$

Auxiliary Model of Type 3

An auxiliary model of type 3 is denoted by $q^3_k$. With $q^3_k$, the calculation cost of the auxiliary model can be reduced further. The auxiliary model of type 3 models the probability of appearance of each local structure z with a single feature n alone. A conditional probability q(z|x, n), which is a local structure z having a feature n in the output structure y given the input structure x, and a conditional probability $q(\neg z|x, n) = 1 - q(z|x, n)$ of the opposite are expressed by the following equations.

$$q_k^3(z \mid x, n; \theta^{(k)}) = \frac{\exp[\theta_n^{(k)} \cdot g_{x,z,n}^{(k)}]}{b(z) + \exp[\theta_n^{(k)} \cdot g_{x,z,n}^{(k)}]} \quad (10)$$

$$q_k^3(\neg z \mid x, n; \theta^{(k)}) = 1 - \frac{\exp[\theta_n^{(k)} \cdot g_{x,z,n}^{(k)}]}{b(z) + \exp[\theta_n^{(k)} \cdot g_{x,z,n}^{(k)}]}$$

$$= \frac{b(z)}{b(z) + \exp[\theta_n^{(k)} \cdot g_{x,z,n}^{(k)}]}$$

Next, $q'^3_k$ is defined as follows, by using the odds for $q^3_k$.

$$q_k'^3(z \mid x, n; \theta^{(k)}) = \mathrm{odds}(q_k^3) \quad (11)$$

$$= \frac{q_k^3(z \mid x, n; \theta^{(k)})}{q_k^3(\neg z \mid x, n; \theta^{(k)})}$$

$$= \frac{\exp[\theta_n^{(k)} \cdot g_{x,z,n}^{(k)}]}{b(z)}$$

$$\propto q_k^3(z \mid x, n; \theta^{(k)})$$

For the subsequent processing, $Q_k$ is defined as follows, where $\theta^{(k)} = \theta^{(k)}_1, \theta^{(k)}_2, \ldots, \theta^{(k)}_{D_k}$ and $g^{(k)}_{x,z} = (g^{(k)}_{x,z,1}, g^{(k)}_{x,z,2}, \ldots, g^{(k)}_{x,z,D_k})$.

$$Q_k(z \mid x; \theta^{(k)}) = \prod_n b(z)\mathrm{odds}(q_k^3) \quad (12)$$

$$= \prod_n b(z) q_k'^3$$

$$= \exp[\theta^{(k)} \cdot g_{x,z}^{(k)}]$$

Here, $Q_k$ is the odds for $q^3_k$ or $q'^3_k$ integrated for n=1, 2, ..., $D_k$.

Base-model

The base-model can be any model if the learned structured prediction model can be expressed by Equation (1)'. It is defined by using $Q_k$ obtained from the auxiliary models $q^1_k$, $q^2_k$, and $q^3_k$ in Equations (6), (9), and (12) respectively. Examples of defining the base-model in accordance with the probability model and in accordance with the max-margin model principle will be described next.

Defining the Base-model in Accordance with the Probability Model

The definition of the base-model P in accordance with the probability model is expressed as given below.

$$P(y \mid x; \lambda, \Theta) = \frac{1}{Z(x, \lambda, \Theta)} \exp[w \cdot f_{x,y}] \prod_k Q_k(y \mid x; \theta^{(k)})^{v_k} \quad (13)$$

$$= \frac{1}{Z(x, \lambda, \Theta)} \prod_{z \in Z(x,y)} \exp[w \cdot f_{x,z}]$$

$$\prod_k Q_k(z \mid x; \theta^{(k)})^{v_k}$$

$$Z(x, \lambda, \Theta) = \sum_{y \in Y(x)} \exp[w \cdot f_{x,y}] \prod_k Q_k(y \mid x; \theta^{(k)})^{v_k}$$

This equation means that the conditional probability P(y|x) that the output structure y is output with respect to the input structure x is defined as the product of the log-linear model and the auxiliary model for the local structures z.

No matter which one of the auxiliary models $q^1_k$, $q^2_k$, and $q^3_k$ is used, the right-hand side of Equation (13) can be reduced as follows.

$$P(y \mid x; \lambda, \Theta) = \frac{1}{Z'(x, \lambda, \Theta)} \prod_{z \in Z(x,y)} \exp[d(, z; \lambda, \Theta)] \quad (14)$$

-continued $$Z'(x, \lambda, \Theta) = \sum_{y \in Y(x)} \prod_{z \in Z(x,y)} \exp[d(x, z; \lambda, \Theta)]$$

$$d(x, z; \lambda, \Theta) = w \cdot f_{x,z} + \sum_k v_k [\theta^{(k)} \cdot g_{x,z}^{(k)}]$$

Especially when there is a single auxiliary model (K=1) and when the base-model feature vector and the auxiliary model feature vector are the same ($f_{x,y} = g^{(1)}_{x,y}$), Equation (14) can be reduced to express d as given below.

$$d(x,z;\lambda,\Theta) = (w + v\theta) \cdot f_{x,z} \quad (15)$$

Defining the Base-model in Accordance with the Max-margin Model

Definition of the base-model P in accordance with the maximization of the margin in the linear identification model is expressed as given below.

$$P(x, y; \lambda, \Theta) = \max[0, E(y, \hat{y}) - d(x, y; \lambda, \Theta) + d(x, \hat{y}; \lambda, \Theta)] \quad (16)$$

$$\hat{y} = \arg\max_{y' \in Y(x) \setminus y} d(x, y'; \lambda, \Theta) + E(y, y')$$

Here, E(y, ŷ) is a function expressing the degree of error for ŷ obtained by comparing a correct output y with a certain output ŷ. The value of E(y, ŷ) increases as the error increases, or as the difference between y and ŷ increases. A\B represents a difference set obtained by subtracting the set B from the set A. Equation (16) means that the difference between the score d(x, y; λ, θ) of the correct output structure y with respect to the input structure x and the score d(x, ŷ;λ, θ) of an incorrect output structure ŷ with the highest risk becomes the estimated error E(y, ŷ) or greater.

Embodiments of the present invention will be described below in detail with these definitions.

First Embodiment

Figure 4:
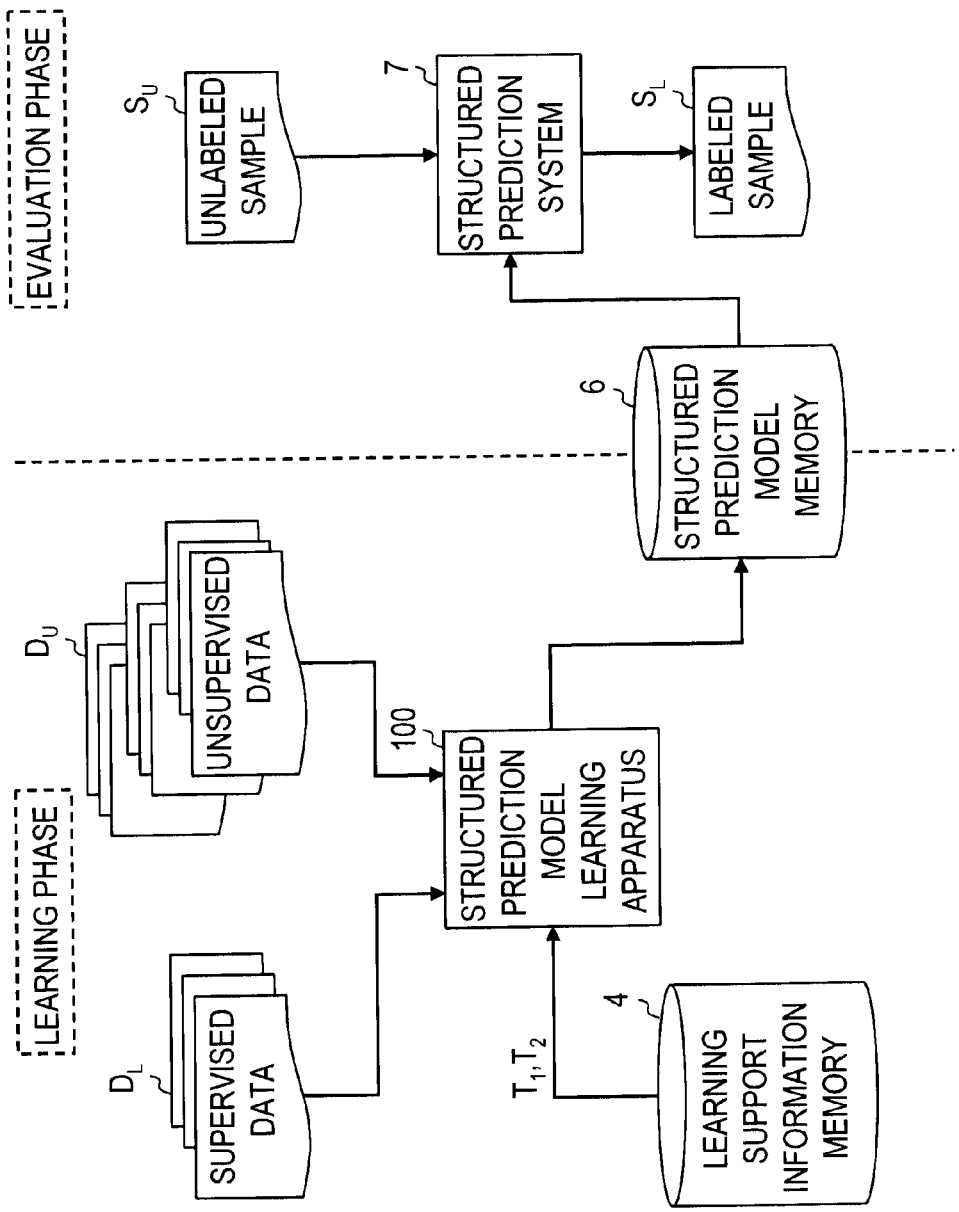
FIG. 4 shows the relationship between a structured prediction model learning apparatus 100 and a structured prediction system 7.

In a learning phase, a structured prediction model learning apparatus 100 learns a structured prediction model by using supervised data $D_L$, unsupervised data $D_U$, and information stored in a learning support information memory 4 and outputs the learned structured prediction model to a structured prediction model memory 6, as shown in FIG. 4. The structured prediction model memory 6 stores the learned structured prediction model. A structured prediction system 7 receives the structured prediction model from the structured prediction model memory 6. The structured prediction system 7 further receives an unlabeled sample $S_U$ (input structure x), estimates a labeled sample $S_L$ (output structure y) corresponding to the unlabeled sample by using the structured prediction model, and outputs the labeled sample.

The supervised data $D_L$ is a set of combinations of an input structure x and a supervised signal (ideal output structure y). Supervised data of N samples is expressed as $$D_L = \{(x^{(n)}, y^{(n)})\}_{n=1}^N$$

The unsupervised data $D_U$ is a set of data of input structures x alone, and their correct output structures y are not known. Unsupervised data of M samples is expressed as $$D_U = \{(x^{(m)})\}_{m=1}^M$$

For named entity extraction as shown in FIG. 1, for example, approximately N=10,000 samples and M=10,000,000 samples or greater are required to learn a structured prediction model.

The learning support information memory 4 stores a feature extraction template $T_2$ and a set $T_1$ of definition data for output candidate generation, which will be described later, as learning support information.

Structured Prediction Model Learning Apparatus 100

The structured prediction model learning apparatus 100 in the first embodiment will be described with reference to FIGS. 5 and 6. The structured prediction model learning apparatus 100 is formed, for example, of a central processing unit (CPU), a random access memory (RAM), a read-only memory (ROM), a hard disk drive (HDD), and an input-output interface.

The structured prediction model learning apparatus 100 includes, for example, a memory 103, a controller 105, an output candidate graph generator 110, a feature vector generator 120, a parameter generator 130, an auxiliary model parameter estimating unit 140, a base-model parameter estimating unit 160, a first convergence determination unit 180, and a parameter integrating unit 190. The output candidate graph generator 110 and the feature vector generator 120 are provided to perform preprocessing for learning.

Memory 103 and Controller 105

The memory 103 is formed of the RAM, ROM, HDD, and the like. The memory 103 stores the supervised data $D_L$, the unsupervised data $D_U$, the learning support information, signals and parameters in the middle of processing, and so on. The controller 105 is formed of the CPU and the like. The controller 105 reads and writes signals or parameters from or into the memory 103 during processing. The controller 105 does not necessarily need to read data from or write data into the memory 103 and may control individual units to exchange data directly.

Examples of Input Data

Described below is an example of learning a structured prediction model used to predict an output structure to which a label representing a named entity is given, from an input structure formed of English-language text data. FIGS. 7 and 8 show examples of information input to the structured prediction model learning apparatus 100 shown in FIG. 5. FIG. 7 shows English-language supervised data; and FIG. 8 shows English-language unsupervised data. The example shown in FIG. 7 is identical to the examples shown in FIG. 1. Division into tokens is carried out in advance.

FIG. 9 shows the set $T_1$ of definition data for output candidate generation in this embodiment. The shown set of definition data for output candidate generation consists of five predetermined definition data items for output candidate generation. The set $T_1$ of definition data for output candidate generation is determined automatically by a target structure prediction problem. The structured prediction model learning apparatus 100 obtains the set $T_1$ of definition data for output candidate generation from the learning support information memory 4.

Output Candidate Graph Generator 110

Figure 10:
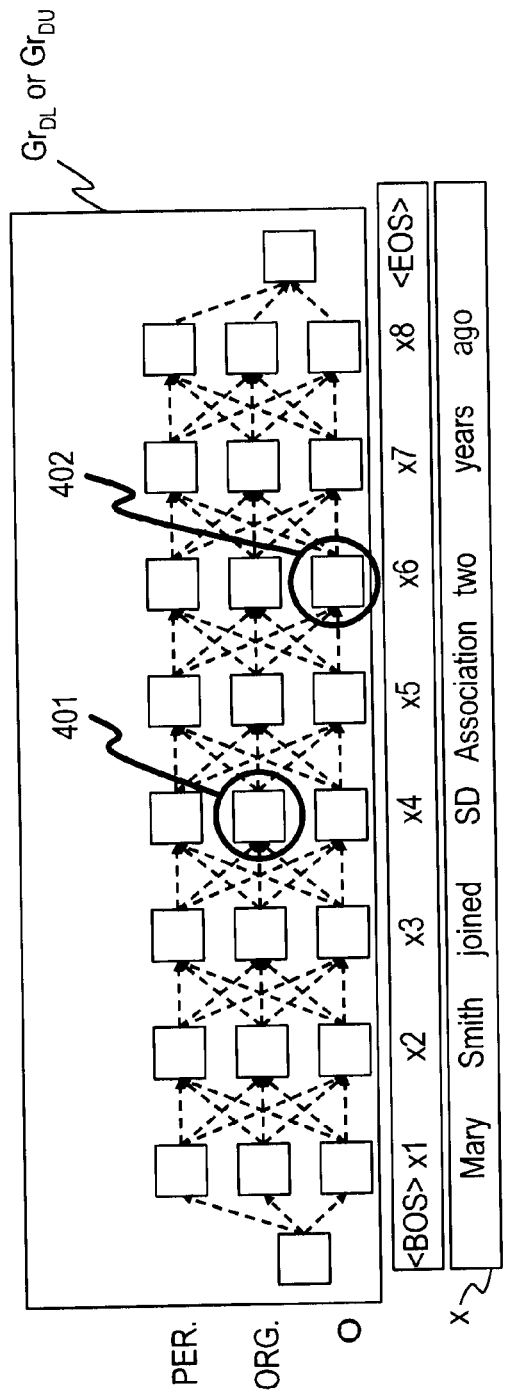
FIG. 10 is an output candidate graph for an English-language input structure.

The output candidate graph generator 110 receives the supervised data $D_L$, the unsupervised data $D_U$, and the set $T_1$ of definition data for output candidate generation. The output candidate graph generator 110 generates a supervised-data output candidate graph $Gr_{DL}$ corresponding to the received supervised data $D_L$ by using the set $T_1$ of definition data for output candidate generation identified by the structure prediction problem (s110). The output candidate graph generator 110 also generates an unsupervised-data output candidate graph $Gr_{DU}$ corresponding to the received unsupervised data $D_U$ by using the set $T_1$ of definition data for output candidate generation (s110). The output candidate graph generator 110 associates the received supervised data $D_L$ with the supervised-data output candidate graph $Gr_{DL}$ generated from the supervised data $D_L$. The output candidate graph generator 110 associates the received unsupervised data $D_U$ with the unsupervised-data output candidate graph $Gr_{DU}$ generated from the unsupervised data $D_U$. The output candidate graph generator 110 further outputs the data items to the feature vector generator 120. The output candidate graph is expressed as a lattice of all possible output structure candidates connected by paths, as shown in FIG. 10. In the examples described below, the set of definition data for output candidate generation consists of three predetermined definition data items for output candidate generation. In the examples shown in FIG. 10, the set of definition data for output candidate generation consists of three definition data items for output candidate generation: PER., ORG., and O. FIG. 10 shows an example of an output candidate graph generated by the structured prediction model learning apparatus 100 shown in FIG. 5. In the graph, <BOS> is a special fixed label representing the beginning of an input structure x; <EOS> is a special fixed label representing the end of the input structure x. The lattice represents output structures y corresponding to an input structure x (supervised data $D_L$ or unsupervised data $D_U$); each node represents an instance $y^e$ (e=1, 2, 3) of the output structures y; and each link represents dependency between instances. A single path between <BOS> and <EOS> in the output candidate graph corresponds to a single output, and the output candidate graph includes all possible output candidates. For example, the output candidate graph in FIG. 10 includes $3^8$ different paths (output candidates) each. Node 401 in FIG. 10 indicates an output instance where a fourth word "SD" in the input structure x is labeled "ORG." Node 402 in FIG. 10 indicates an output instance where a sixth word "two" in the input structure x is labeled "O".

Feature Vector Generator 120

The feature vector generator 120 receives a feature extraction template $T_2$, the supervised-data output candidate graph $Gr_{DL}$, and the unsupervised-data output candidate graph $Gr_{DU}$. The feature vector generator 120 extracts features from the supervised-data output candidate graph $Gr_{DL}$ and the unsupervised-data output candidate graph $Gr_{DU}$ by using the received feature extraction template $T_2$ (s120). The feature vector generator 120 generates a feature vector $f_{x,y}$ for a D-dimensional base-model, corresponding to the set of features extracted from the supervised-data output candidate graph $Gr_{DL}$ (s120). The feature vector generator 120 divides the set of features extracted from the unsupervised-data output candidate graph $Gr_{DU}$ into K subsets. The feature vector generator 120 generates a feature vector $g^{(k)}_{x,y}$ for a $D_k$-dimensional auxiliary model, corresponding to a feature included in a subset k of the K subsets (s120). The feature vector generator 120 assigns the feature vectors $f_{x,y}$ for the base-model to the supervised-data output candidate graph $Gr_{DL}$ and outputs them to the parameter generator 130. The feature vector generator 120 assigns the feature vectors $g^{(k)}_{x,y}$ for the auxiliary model to the unsupervised-data output candidate graph $Gr_{DU}$ and outputs them to the parameter generator 130.

Figure 11:
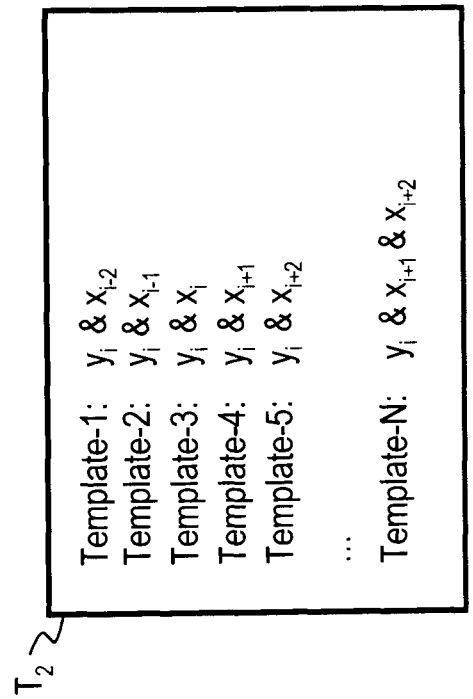
FIG. 11 shows a feature extraction template $T_2$.
Figure 12:
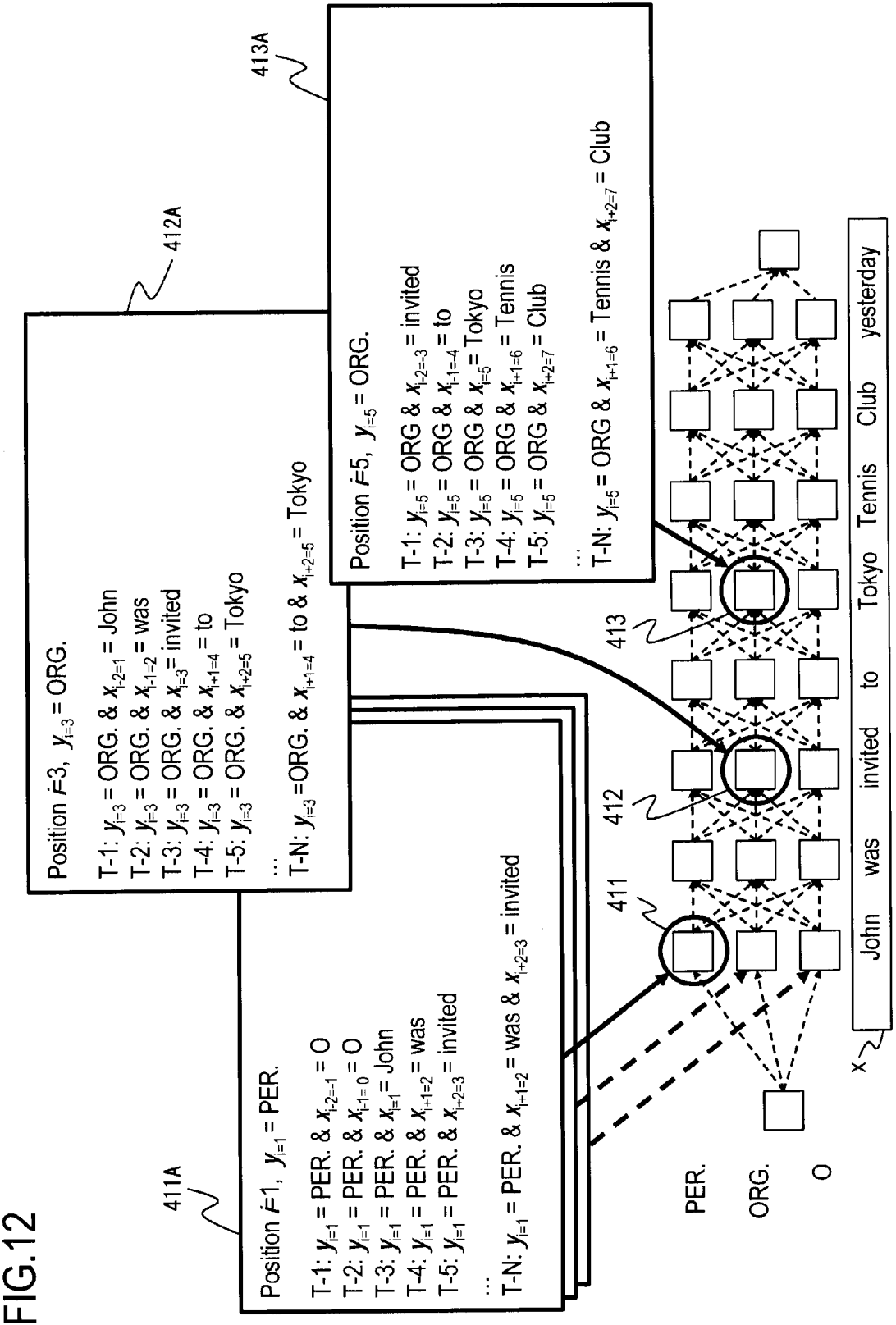
FIG. 12 shows an example of extracting features from the output candidate graph with respect to the English-language input structure by using the feature extraction template $T_2$.

How the feature vector generator 120 extracts a feature from an output candidate graph will be described below. The feature vector generator 120 extracts a feature from the output candidate graph in accordance with a combination of a label $y_i$ and an instance in the input structure described in the feature extraction template, where the label $y_i$ is the i-th label of an output structure. FIG. 11 shows an example of the feature extraction template $T_2$. Using the feature extraction template $T_2$, the feature vector generator 120 extracts, as features, combinations ($y_i$ & $x_{i-2}$, $y_i$ & $x_{-1}$, $y_i$ & $x_i$, $y_i$ & $x_{i+1}$, and $y_i$ & $x_{i+2}$) of the label $y_i$ and up to two input words $x_{i-2}$, $x_{i-1}$, $x_i$, $x_{i+1}$, and $x_{i+2}$ before and after the label, a combination ($y_i$ & $x_{i+1}$ & $x_{i+2}$) of the label $y_i$ and two input words $x_{i+1}$ and $x_{i+2}$ after the label, and the like. FIG. 12 shows an example in which the feature vector generator 120 extracts features from the output candidate graph by using the feature extraction template $T_2$.

In FIG. 12, the first label ($y_1$) of output structures is "PER." at node 411. The feature vector generator 120 extracts features 411A indicated in FIG. 12. The third label ($y_3$) of output structures is "ORG" at node 412. The feature vector generator 120 extracts features 412A indicated in FIG. 12. The fifth label ($y_5$) of output structures is "ORG." at node 413. The feature vector generator 120 extracts features 413A indicated in FIG. 12.

How to generate and assign a feature vector will be described next. The feature vector generator 120 collects features extracted from all nodes of all supervised-data output candidate graph $Gr_{DL}$ obtained from all the supervised data $D_L$, eliminates identical features, and generates a supervised-data feature set. The number of elements included in each unsupervised-data feature set should be D.

The feature vector generator 120 also collects features extracted from all nodes of the unsupervised-data output candidate graph $Gr_{Du}$ obtained from all unsupervised data $D_U$, eliminates identical features, and generates an unsupervised-data feature set. The feature vector generator 120 divides the unsupervised-data feature set into K subsets. It would be better to divide the unsupervised-data feature set in accordance with feature types. The feature types may be the medium type (newspaper, web, etc.), content type (economy, sports, etc.), author, and the like, of the unsupervised data. The number of elements included in each subset should be $D_k$. Since some different feature types may have different distributions, this configuration can improve the prediction performance.

The feature vector generator 120 assigns a feature vector to each node (or each link) of the output candidate graph. The base-model feature vector $f_{x,y}$ is a D-dimensional vector consisting of elements in one-to-one correspondence with the elements of the feature set extracted from the supervised-data output candidate graph $Gr_{DL}$. The auxiliary model feature vector $g^{(k)}_{x,y}$ is a $D_k$-dimensional vector consisting of elements in one-to-one correspondence with the elements of a subset of the feature set extracted from the unsupervised-data output candidate graph $Gr_{DU}$. No matter whether the source is the supervised-data output candidate graph $Gr_{DL}$ or the unsupervised-data output candidate graph $Gr_{DU}$, the feature vector is assigned in the same way. FIG. 13 shows a feature vector assigned to node 411 in FIG. 12. FIG. 14 shows a feature vector assigned to node 412 in FIG. 12. The feature vector generator 120 gives a value "1" to a feature extracted from the node and a value "0" to a feature that cannot be extracted from the node, so a feature vector having elements "1" or "0" is generated. The feature vector generator 120 assigns the generated feature vector to the corresponding node. The feature vector generator 120 generates features in accordance with a combination of each label and each of up to two input words before and after the label, and the like. Therefore, the feature vectors of nodes corresponding to the i-th word of the input structure but having different i-th labels in the output structure are orthogonal vectors. The inner product of them is 0.

Parameter Generator 130

The parameter generator 130 receives the supervised-data output candidate graph $Gr_{DL}$ having the base-model feature vectors $f_{x,y}$ assigned thereto and the unsupervised-data output candidate graph $Gr_{D_U}$ having the auxiliary model feature vectors $g^{(k)}_{x,y}$ assigned thereto. The parameter generator 130 generates a base-model parameter set λ that includes a first parameter set $w=\{w_1, w_2, \ldots, w_D\}$ consisting of D first parameters in one-to-one correspondence with the D elements of the base-model feature vector $f_{x,y}$ (s130) and outputs the set to the base-model parameter estimating unit 160.

The parameter generator 130 also generates an auxiliary model parameter set $\theta^{(k)}=\{\theta^{(k)}_1, \theta^{(k)}_2, \ldots, \theta^{(k)}_D\}$ consisting of $D_k$ auxiliary model parameters in one-to-one correspondence with the $D_k$ elements of the auxiliary model feature vector $g^{(k)}_{x,y}$. The parameter generator 130 further generates a set $\Theta=\{\theta^{(1)}, \theta^{(2)}, \ldots, \theta^{(K)}\}$ of auxiliary model parameter sets consisting of K auxiliary model parameter sets $\theta^{(k)}$ (s130), and outputs the set to the auxiliary model parameter estimating unit 140.

Figure 15:
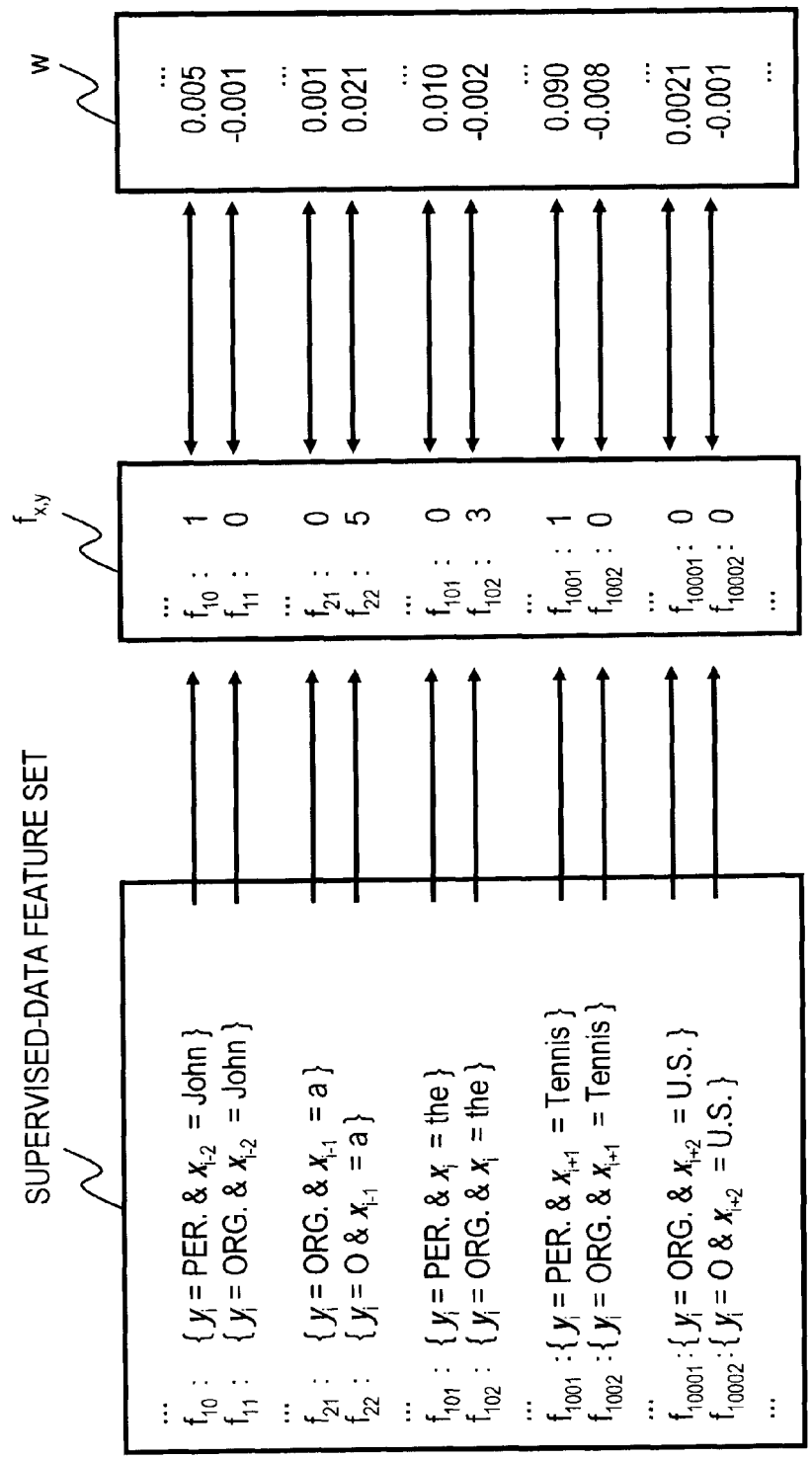
FIG. 15 shows data examples in a base-model parameter set λ with respect to the English-language input structure.
Figure 16:
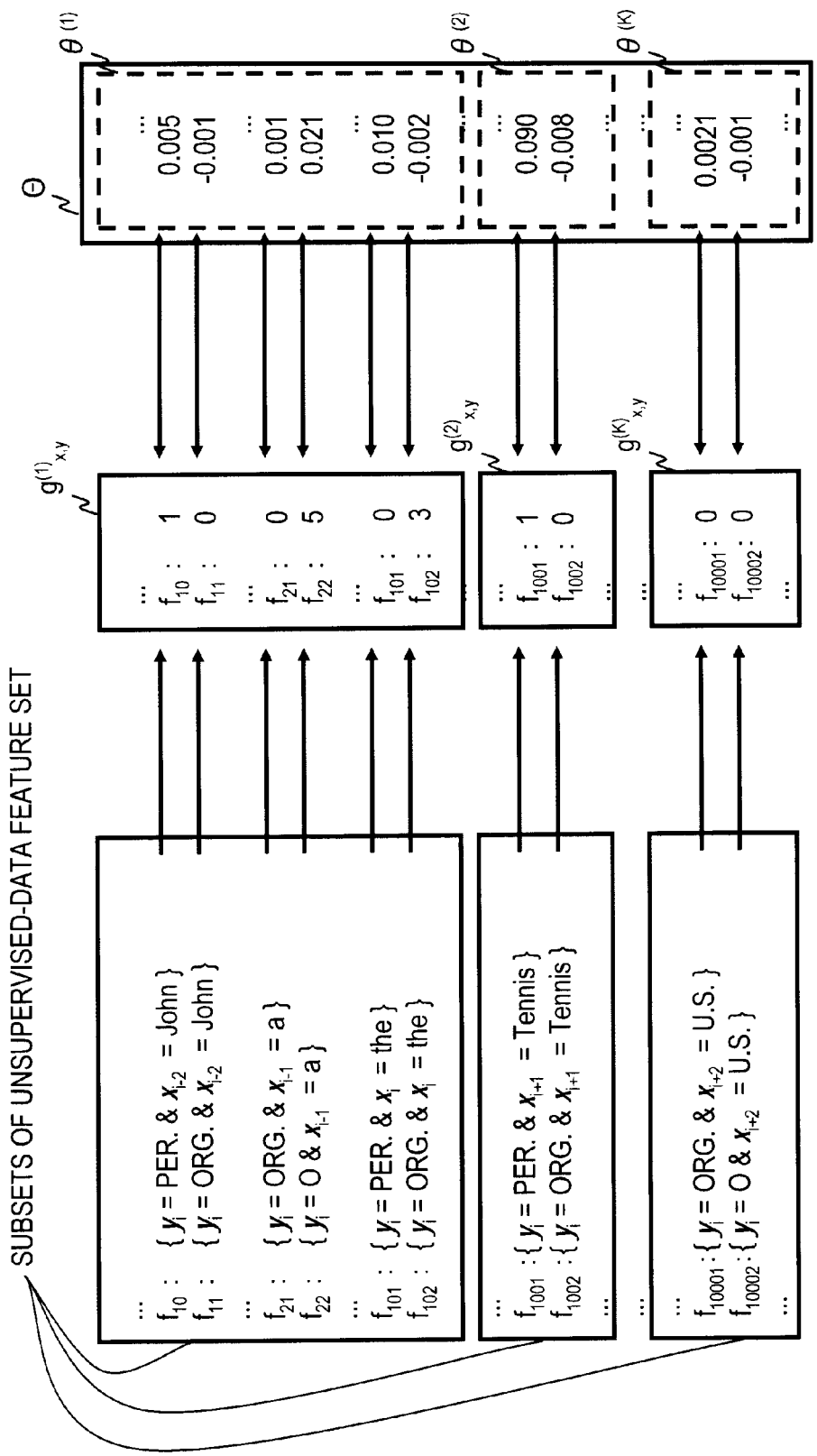
FIG. 16 shows data examples in a set Θ of auxiliary model parameter sets with respect to the English-language input structure.

The parameter generator 130 specifies "0" as the initial value of each parameter, for example. FIG. 15 shows a data example in the base-model parameter sets λ. FIG. 16 shows a data example in the sets Θ of auxiliary model parameter sets.

The parameter generator 130 may also generate a parameter t=0, indicating the number of estimation repetitions of the auxiliary model parameter estimating unit 140 and the base-model parameter estimating unit 160.

Auxiliary Model Parameter Estimating Unit 140

The auxiliary model parameter estimating unit 140 obtains a regularization term from an auxiliary model parameter set $\theta^{(k)}$. The auxiliary model parameter estimating unit 140 further estimates a set Θ of auxiliary model parameter sets that minimizes the Bregman divergence with a regularization term between a reference function $\tilde{r}(x,y)$ and an auxiliary model $q_k$, by using the unsupervised data $D_U$ (s140).

The auxiliary model parameter estimating unit 140, for example, receives the reference function $\tilde{r}(x,y)$, the set Θ of auxiliary model parameter sets, and the unsupervised-data output candidate graph $Gr_{D_U}$ having the auxiliary model feature vectors $g^{(k)}_{x,y}$ assigned thereto.

The auxiliary model parameter estimating unit 140 estimates the set Θ of auxiliary model parameter sets that minimize the Bregman divergence between the reference function $\tilde{r}$ and the auxiliary model $q_k$. To minimize the Bregman divergence between the reference function and the auxiliary model means to obtain a set Θ of auxiliary model parameter sets that bring the auxiliary model closest to the reference function in the solution space. When the Bregman divergence is minimized, an $L_1$ regularization term is included. This enables the memory space needed to store the learned structured prediction model to be reduced. If each auxiliary model $q_k$ defines an auxiliary model parameter set $\theta^{(k)}$ by a probability model, the total must be 1, and the $L_1$ regularization term cannot be included. In this embodiment, each auxiliary model $q_k$ defines an auxiliary model parameter set $\theta^{(k)}$ by a log-linear model. Since the log-linear model does not have the restriction given above, the $L_1$ regularization term can be included.

Reference Function

A reference function is defined first. The reference function $\tilde{r}(x, y)$ is a nonnegative function. The value range is $[0, \infty)$. When using the above auxiliary models $q^1_k, q^2_k,$ and $q^3_k$, the value range of the reference function is [0,1], because the value range of the above auxiliary models is also [0,1]. The reference function $\tilde{r}(x, y)$ represents the degree of pseudo accuracy of the output structure y with respect to the input structure x. For example, when the auxiliary model parameter estimating unit 140 estimates auxiliary model parameters for the first time, supervised data $D_L$ should be used beforehand to estimate a first parameter set w (Japanese Patent Application Laid Open No. 2008-225907), and a base-model obtained by defining the estimated first parameter set w with a log-linear model is used as the reference function (there is no auxiliary model, and the elements of a second parameter v are set to 0, for example). In this case, $\tilde{r}(x, z) = P(z|x, w^*)$.

When the auxiliary model parameter estimating unit 140 estimates auxiliary model parameters for the second or subsequent time, the base-model $P(z|x, \lambda^{t-1}, \Theta^{t-1})$ obtained in the preceding session of repeated calculation is used as the reference function. A function predetermined by a person or a completely different model (such as the language analysis model mentioned in Japanese Patent Application Laid Open No. 2008-225907) can also be used as the reference function.

Bregman Divergence

The Bregman divergence $B_F$ between the reference function $\tilde{r}$ and the auxiliary model $q_k$ is defined as given below.

$$B_F(\tilde{r}\|q_k) = F(\tilde{r}) - F(q_k) - \nabla F(q_k) \cdot (q_k - \tilde{r}) \quad (21)$$

Here, F is a continuously differentiable real-valued and strictly convex function. For example, an $L_2$ norm is used as F. In this embodiment, $F(x) = \Sigma x \log x - \Sigma x$. Then, the Bregman divergence $B_F$ becomes identical to a generalized relative entropy G, as indicated by Equation (22) below.

$$B_{F(x)=\Sigma x \log x - \Sigma x} = G(\tilde{r}\|q_k) \quad (22)$$
$$= \sum \tilde{r}\log[\tilde{r}] - \sum \tilde{r}\log[q_k] - \sum \tilde{r} + \sum q_k$$

In the end, the estimation of the set Θ of auxiliary model parameter sets means to minimize the generalized relative entropy G with an $L_1$ norm regularization term between the reference function $\tilde{r}$ and the auxiliary model $q_k$. To obtain the correct generalized relative entropy, all possible input and output pairs (x,y) are required. However, it is impossible to list all possible input and output pairs. Therefore, in real situation, unsupervised data $D_U$ are used instead of all possible input and output pairs. A generalized relative entropy obtained by using the limited size of observed data is called an empirical generalized relative entropy and is denoted by $\hat{G}_{D_U}$. The equation for obtaining an optimum set Θ of auxiliary model parameter sets (equation for minimizing the empirical generalized relative entropy $U(\Theta|D_U)$ with a regularization term) is expressed as follows.

$$\Theta^* = \arg\min_\Theta U(\Theta | D_U) \quad (23)$$
$$U(\Theta | D_U) = C_U \sum_k |\theta^{(k)}|_1 + \sum_k \hat{G}_{D_U}(\tilde{r}\|q_k)$$

Here, $|\theta^{(k)}|_1$ denotes the L1 norm of the k-th auxiliary model parameter set $\theta^{(k)}$. $C_U$ is a variable for adjusting the degree of importance of the first and second terms on the right-hand side. This means that $C_U$ determines whether the empirical generalized relative entropy or the $L_1$ regularization term is regarded as more important. $C_U$ is also a hyper parameter to be adjusted manually.

An empirical generalized relative entropy $U(\Theta|D_U)$ with a regularization term obtained by using an auxiliary model $q^1_k, q^2_k, q^3_k, q'^1_k, q'^2_k,$ or $q'^3_k$ will be described next.

Using $q^1_k$

When $q^1_k$ is used as an auxiliary model, the empirical generalized relative entropy $U(\Theta|D_U)$ with a regularization term is expressed as follows, by using Equations (22), (23), and (4).

$$U(\Theta \mid D_U) = C_U \sum_k |\theta^{(k)}|_1 + \sum_k \hat{K}_{D_U}(\tilde{r}(x,y) \| q_k^1(y \mid x; \theta^{(k)})) \quad (24)$$

$$= C_U \sum_k |\theta^{(k)}|_1 - \sum_k \sum_{x \in D_U} \sum_y \tilde{r}(x,y)[\theta^{(k)} \cdot g_{x,y}^{(k)}] +$$

$$\sum_k \sum_{x \in D_U} \sum_y \log[b(y) + \exp[\theta^{(k)} \cdot g_{x,y}^{(k)}]] + const(\theta^{(k)})$$

Here, $const(\theta^{(k)})$ is a collective value of constant terms with respect to $\theta^{(k)}$. In optimization (when $U(\Theta|D_U)$ is minimized), $const(\theta^{(k)})$ does not affect the solution. The gradient of Equation (24) is expressed as follows.

$$\nabla_k U(\Theta \mid D_U) = \quad (25)$$
$$C_U \sigma(\theta^{(k)}) - \sum_{x \in D_U} \sum_y \tilde{r}(x,y)[g_{x,y}^{(k)}] + \sum_{x \in D_U} \sum_y q_k^1(y \mid x; \theta^{(k)})[g_{x,y}^{(k)}]$$

Here, $\sigma(a)$ is a function that returns a vector in response to vector a, replacing each element of vector a by $-1$, 0, or 1. If the element is greater than 0, $\sigma(a)$ replaces the value by 1; if the element is smaller than 0, $\sigma(a)$ replaces the value by $-1$; and if the element is 0, $\sigma(a)$ replaces the value by 0. The equation (23) obtains the optimum value (obtains the minimum value of $U(\Theta|D_U)$) when $\nabla_k U(\Theta|D_U)=0$ at all values of k. Actually, the optimum value can be obtained by a gradient-based optimization method.

Using $q'^1$

When $q'^1_k$ is used, the empirical generalized relative entropy $U(\Theta|D_U)$ with a regularization term is expressed as follows, by using Equations (22), (23), and (5).

$$U(\Theta \mid D_U) = C_U \sum_k |\theta^{(k)}|_1 + \sum_k \hat{K}_{D_U}(\tilde{r}(x,y) \| q_k'^1(y \mid x; \theta^{(k)})) \quad (26)$$

$$= C_U \sum_k |\theta^{(k)}|_1 - \sum_k \sum_{x \in D_U} \sum_y \tilde{r}(x,y)[\theta^{(k)} \cdot g_{x,y}^{(k)}] +$$

$$\sum_k \sum_{x \in D_U} \sum_y q_k'^1(y \mid x; \theta^{(k)}) + const(\theta^{(k)})$$

The gradient of Equation (26) is expressed as follows.

$$\nabla_k U(\Theta \mid D_U) = \quad (27)$$
$$C_U \sigma(\theta^{(k)}) - \sum_{x \in D_U} \sum_y \tilde{r}(x,y)[g_{x,y}^{(k)}] + \sum_{x \in D_U} \sum_y q_k'^1(y \mid x; \theta^{(k)})[g_{x,y}^{(k)}]$$

Using $q^2$

When $q^2_k$ is used as an auxiliary model, the empirical generalized relative entropy $U(\Theta|D_U)$ with a regularization term is expressed as follows, by using Equations (22), (23), and (7).

$$U(\Theta \mid D_U) = C_U \sum_k |\theta^{(k)}|_1 + \sum_k \hat{K}_{D_U}(\tilde{r}(x,z) \| q_k^2(z \mid x; \theta^{(k)})) \quad (28)$$

$$= C_U \sum_k |\theta^{(k)}|_1 - \sum_k \sum_{x \in D_U} \sum_{z \in Z(x,Y(x))} \tilde{r}(x,z)[\theta^{(k)} \cdot g_{x,z}^{(k)}] +$$

$$\sum_k \sum_{x \in D_U} \sum_{z \in Z(x,Y(x))} \log[b(z) + \exp[\theta^{(k)} \cdot g_{x,z}^{(k)}]] + const(\theta^{(k)})$$

The gradient of Equation (28) is expressed as follows.

$$\nabla_k U(\Theta \mid D_U) = C_U \sigma(\theta^{(k)}) - \quad (29)$$
$$\sum_{x \in D_U} \sum_{z \in Z(x,Y(x))} \tilde{r}(x,y)[g_{x,z}^{(k)}] + \sum_{x \in D_U} \sum_{z \in Z(x,Y(x))} q_k^2(z \mid x; \theta^{(k)})[g_{x,z}^{(k)}]$$

Using $q'^2$

When $q'^2_k$ is used, the empirical generalized relative entropy $U(\Theta|D_U)$ with a regularization term is expressed as follows, by using Equations (22), (23), and (8).

$$U(\Theta \mid D_U) = C_U \sum_k |\theta^{(k)}|_1 + \sum_k \hat{K}_{D_U}(\tilde{r}(x,z) \| q_k'^2(z \mid x; \theta^{(k)})) \quad (30)$$

$$= C_U \sum_k |\theta^{(k)}|_1 - \sum_k \sum_{x \in D_U} \sum_{z \in Z(x,Y(x))} \tilde{r}(x,z)[\theta^{(k)} \cdot g_{x,z}^{(k)}] +$$

$$\sum_k \sum_{x \in D_U} \sum_{z \in Z(x,Y(x))} q_k'^2(z \mid x; \theta^{(k)}) + const(\theta^{(k)})$$

The gradient of Equation (30) is expressed as follows.

$$\nabla_k U(\Theta \mid D_U) = C_U \sigma(\theta^{(k)}) - \quad (31)$$
$$\sum_{x \in D_U} \sum_{z \in Z(x,Y(x))} \tilde{r}(x,z)[g_{x,z}^{(k)}] + \sum_{x \in D_U} \sum_{z \in Z(x,Y(x))} q_k'^2(z \mid x; \theta^{(k)})[g_{x,z}^{(k)}]$$

If the auxiliary model is of type 2, the whole output structure y is not calculated, and local structures z are calculated. With this configuration, type 2 is expected to provide higher speed than type 1. Similarly to when an auxiliary model of type 1 is used, when an auxiliary model of type 2 is used, the optimum value can be obtained by a gradient-based optimization method.

Using $q^3$

When $q^3_k$ is used as an auxiliary model, the empirical generalized relative entropy $U(\Theta|D_U)$ with a regularization term is expressed as follows, by using Equations (22), (23), and (10).

$$U(\Theta \mid D_U) = C_U \sum_k |\theta^{(k)}|_1 + \sum_k \hat{K}_{D_U}(\tilde{r}(x,z) \| q_k^3(z \mid x, n; \theta^{(k)})) \quad (32)$$

$$= C_U \sum_k |\theta^{(k)}|_1 - \sum_k \sum_{x \in D_U} \sum_{z \in Z(x,Y(x))} \tilde{r}(x,z)[\theta_n^{(k)} \cdot g_{x,z,n}^{(k)}] +$$

$$\sum_k \sum_{x \in D_U} \sum_{z \in Z(x,Y(x))} \log[b(z) + \exp[\theta_n^{(k)} \cdot g_{x,z,n}^{(k)}]] + const(\theta_n^{(k)})$$

The gradient of Equation (32) is expressed as follows.

$$\nabla_{k,n} U(\Theta \mid D_U) = C_U \sigma(\theta_n^{(k)}) - \sum_{x \in D_U} \sum_{z \in Z(x,Y(x))} \tilde{r}(x,z)[g_{x,z,n}^{(k)}] + \quad (33)$$

-continued
$$\sum_{x \in D_U} \sum_{z \in Z(x,Y(x))} q_k^{\prime 3}(z \mid x, n; \theta_n^{(k)})[g_{x,z,n}^{(k)}]$$

Using $q^{\prime 3}$

When $q_k^{\prime 3}$ is used, the empirical generalized relative entropy $U(\Theta|D_U)$ with a regularization term is expressed as follows, by using Equations (22), (23), and (11).

$$U(\Theta \mid D_U) = C_U \sum_k |\theta^{(k)}|_1 + \sum_k \hat{K}_{D_U}(\tilde{r}(x,z) \| q_k^{\prime 3}(z \mid x, n; \theta^{(k)})) \quad (34)$$

$$= C_U \sum_k |\theta^{(k)}|_1 - \sum_k \sum_{x \in D_U} \sum_{z \in Z(x,Y(x))}$$

$$\tilde{r}(x,z)[\theta_n^{(k)} \cdot g_{x,z,n}^{(k)}] +$$

$$\sum_k \sum_{x \in D_U} \sum_{z \in Z(x,Y(x))} q_k^{\prime 3}(z \mid x, n; \theta_n^{(k)}) + const(\theta_n^{(k)})$$

The gradient of Equation (34) is expressed as follows.

$$\nabla_{k,n} U(\Theta \mid D_U) = C_U \sigma(\theta_n^{(k)}) - \sum_{x \in D_U} \sum_{z \in Z(x,Y(x))} \tilde{r}(x,z)[g_{x,z,n}^{(k)}] + \quad (35)$$

$$\sum_{x \in D_U} \sum_{z \in Z(x,Y(x))} q_k^{\prime 3}(z \mid x, n; \theta_n^{(k)})[g_{x,z,n}^{(k)}]$$

When an auxiliary model of type 3 is used, the need for considering the dependency between parameters is eliminated. The solution can be obtained by a linear search with a single variable. This greatly simplifies the calculation of the gradient, which occupies most of the calculation in optimizing the numeric value. Accordingly, it is very suitable to use an auxiliary model of type 3 in terms of the calculation cost in learning.

No matter whether an auxiliary model of type 1, 2, or 3 is used, the empirical generalized relative entropy $U(\Theta|D_U)$ with a regularization term becomes a convex function for each parameter. Therefore, a single optimum solution is determined.

Figure 17:
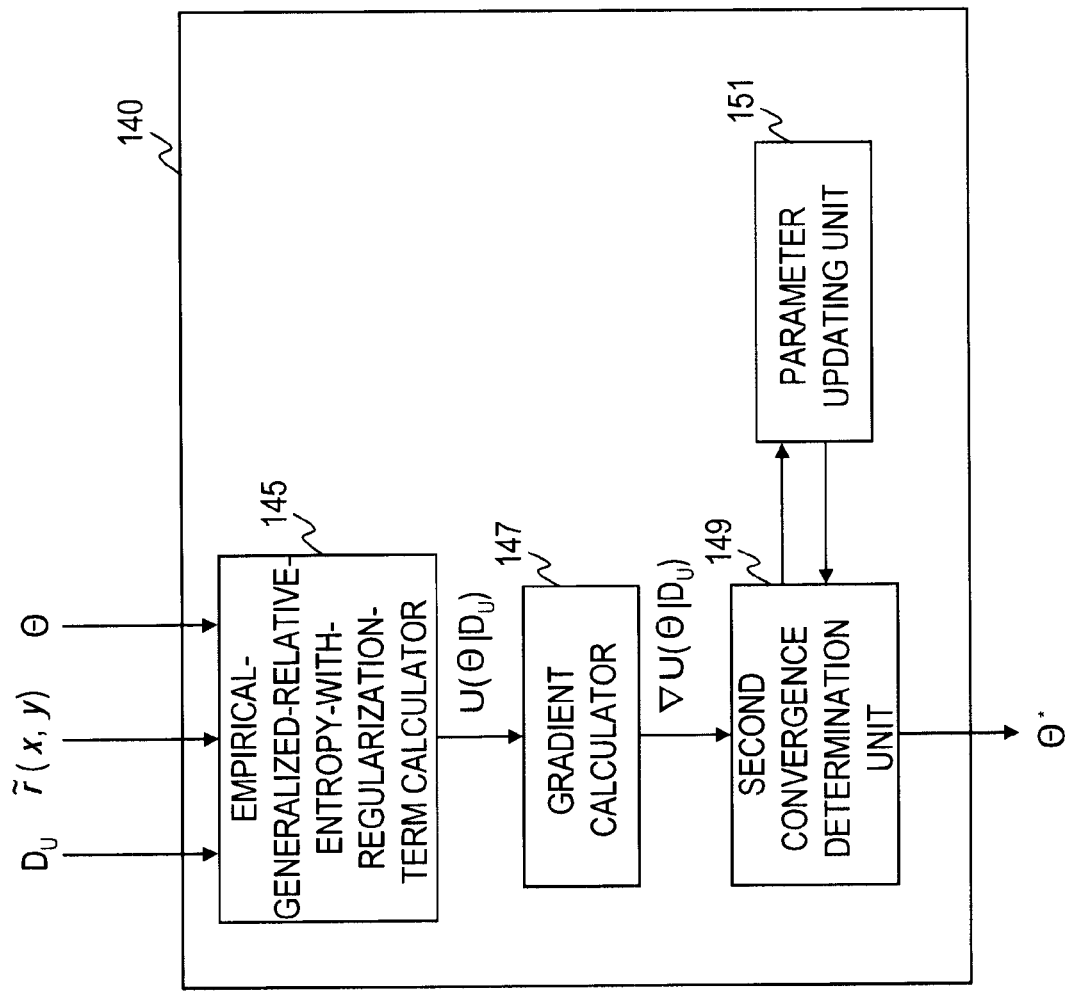
FIG. 17 is a functional block diagram of an auxiliary model parameter estimating unit 140.
Figure 18:
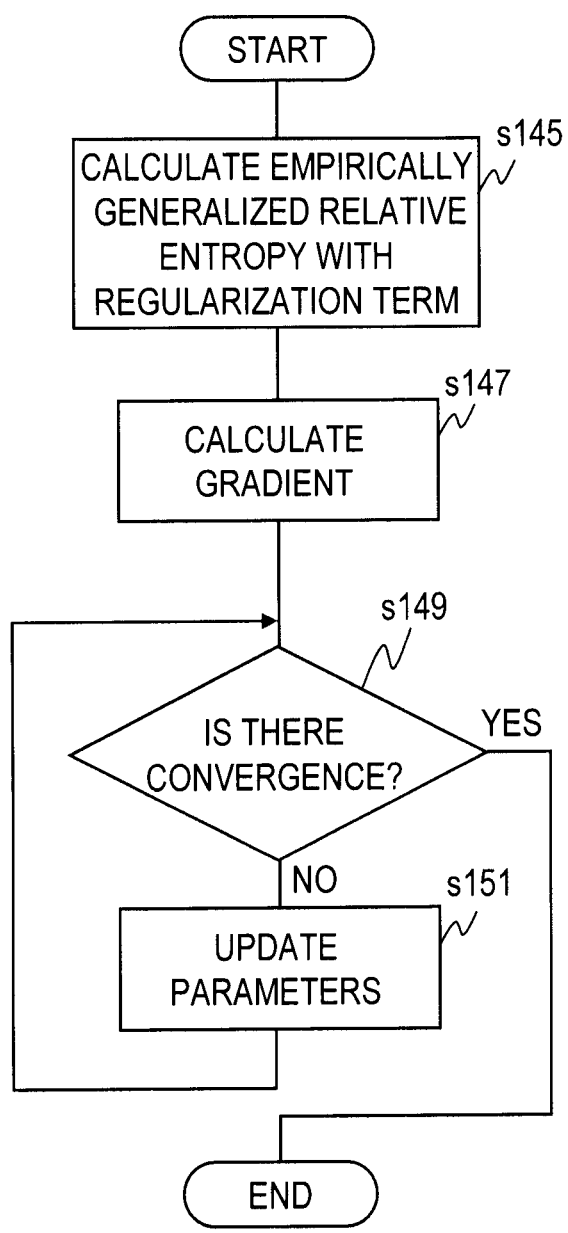
FIG. 18 is a flowchart of processing in the auxiliary model parameter estimating unit 140.

Configuration of the Auxiliary Model Parameter Estimating Unit 140 and Processing Flow The auxiliary model parameter estimating unit 140 will be described with reference to FIGS. 17 and 18. To estimate the set $\Theta$ of auxiliary model parameter sets in accordance with a conditional random field, the auxiliary model parameter estimating unit 140 includes an empirical-generalized-relative-entropy-with-regularization-term calculator 145, a gradient calculator 147, a second convergence determination unit 149, and a parameter updating unit 151. The conditional random field is described in detail in F. Sha and F. Pereria, "Shallow Parsing with Conditional Random Fields", Proceedings of HLT/NAACL-2003, pages 134-141, 2003 (hereafter reference literature 1), for example, and a description thereof will be omitted here.

The empirical-generalized-relative-entropy-with-regularization-term calculator 145 receives the unsupervised data $D_U$, the reference function $\tilde{r}(x, y)$, and the set $\Theta$ of auxiliary model parameter sets and calculates an empirical generalized relative entropy $U(\Theta|D_U)$ with a regularization term in Equation (24), (26), (28), (30), (32), or (34) (s145). The empirical-generalized-relative-entropy-with-regularization-term calculator 145 outputs the empirical generalized relative entropy $U(\Theta|D_U)$ with a regularization term to the gradient calculator 147.

To optimize (minimize) the empirical generalized relative entropy $U(\Theta|D_U)$ with a regularization term, a gradient-based numerical optimization method such as L-BFGS can be used. L-BFGS is described in D. C. Liu and J. Nocedal, "On the Limited Memory BFGS Method for Large Scale Optimization", Math. Programming, Ser. B, 1989, Volume 45, Issue 3, pp. 503-528 (reference literature 2 hereafter), for example, and a description thereof will be omitted here.

The gradient calculator 147 calculates the gradient of $U(\Theta|D_U)$. The gradients of Equations (24), (26), (28), (30), (32), and (34) are expressed by Equations (25), (27), (29), (31), (33), and (35), respectively.

The second convergence determination unit 149 determines whether the gradient $\nabla U(\Theta|D_U)$ expressed by Equation (25), (27), (29), (31), (33), or (35) has converged (s149). When it is determined that the value of the gradient $\nabla U(\Theta|D_U)$ has converged, the second convergence determination unit 149 outputs the set $\Theta^*$ of auxiliary model parameter sets at that time to the first convergence determination unit 180 and the base-model parameter estimating unit 160. If it is not determined that the value of the gradient $\nabla U(\Theta|D_U)$ has converged, the parameter updating unit 151 updates the set $\Theta$ of auxiliary model parameter sets (s151).

Base-Model Parameter Estimating Unit 160

The base-model parameter estimating unit 160 estimates a base-model parameter set $\lambda$ that minimizes a predefined empirical risk function, by using the supervised data $D_L$ and the set $\Theta$ of auxiliary model parameter sets (s160).

The risk function and regularization term can be defined in many ways. For example, they are defined as follows.

$$\lambda^* = \operatorname*{argmin}_\lambda L(\lambda \mid \Theta, D_L) \quad (41)$$

$$L(\lambda \mid \Theta, D_L) = R(\lambda \mid \Theta, D_L) + C_L \Omega(\lambda)$$

Here, $R(\lambda|\Theta, D_L)$ represents an arbitrary risk function. The risk function is a function for estimating an error in learning. A smaller value of the risk function indicates that learning is more successful. Like $C_U$ in Equation (23), $C_L$ is a hyper parameter to be adjusted manually. $\Omega(\lambda)$ indicates a regularization term with respect to $\lambda$. An $L_1$ norm regularization term or an $L_2$ norm regularization term is used, for example.

L1 norm regularization $\Omega(\lambda) = \|\lambda\|_1$

L2 norm regularization $\Omega(\lambda) = |\lambda|_2^2$ (42)

Using Negative Log Likelihood as the Risk Function

An example of using negative log likelihood as the risk function will be described. In minimization of the negative regularized log likelihood, optimum parameters are obtained by the following equation.

$$R(\lambda \mid \Theta, D_L) = -\sum_{(x,y) \in D_L} \log \frac{\exp[d(x, y; \lambda, \Theta)]}{\sum_y \exp[d(x, y; \lambda, \Theta)]} \quad (43)$$

This is a general optimization method when a probability model is used as the base-model. The gradient of Equation (43) can be expressed as follows.

$$\nabla R(\lambda \mid \Theta) = -E_{\tilde{P}_{D_L}(x,y)}[f] + E_{P(y|x;\lambda,\Theta)}[f] \quad (44)$$

The gradient of the regularization term is expressed as follows.

$L1$ norm regularization $\nabla\Omega(\lambda)=\sigma(\lambda)$ $L2$ norm regularization $\nabla\Omega(\lambda)=2\lambda$ (45)

When Equation (43) is substituted into Equation (41), the gradient of Equation (41) is expressed as follows.

$$\nabla L(\lambda\mid\Theta) = -E_{\tilde{P}_{D_L}(x,y)}[f] + E_{P(y\mid x;\lambda,\Theta)}[f] + C_L\nabla\Omega(\lambda) \quad (46)$$

$\tilde{P}_{D_L}(x, y)$ represents the empirical probability of x and y appearing in the supervised data $D_L$.

$$E_{\tilde{P}_{D_L}(x,y)}[f]$$

represents the empirical expectation of the feature vector f in the supervised data $D_L$. Therefore, $$E_{\tilde{P}_{D_L}(x,y)}[f]$$

is a vector of the sum of the feature vectors appearing in the supervised data $D_L$ actually used in learning. The optimum parameters in Equation (41) are obtained when the gradient of Equation (46) becomes 0. In the actual optimization, they can be obtained by a gradient-based numerical optimization method such as L-BFGS (see reference literature 2).

Estimation Based on Max-margin Model

The estimation of the base-model parameter set $\lambda$ based on the max-margin principle will be described next. In this case, the risk function is expressed as follows.

$$R(\lambda\mid\Theta, D_L) = \sum_{(x,y)\in D_L} \max[0, E(y, \hat{y}) - d(x, y; \lambda, \Theta) + d(x, \hat{y}; \lambda, \Theta)] \quad (47)$$

$$\hat{y} = \underset{y'\in Y(x)\setminus y}{\operatorname{argmax}} d(x, y'; \lambda, \Theta) + E(y, y')$$

When Equation (47) and the $L_2$ regularization term of Equation (45) are substituted into Equation (41), the gradient of Equation (41) is expressed as follows.

$$\nabla L(\lambda\mid\Theta) = \begin{cases} -f_{x,y} + f_{x,\hat{y}} - \sum_{k=1}^{K}\theta^{(k)}\cdot g_{x,y}^{(k)} + \sum_{k=1}^{K}\theta^{(k)}\cdot g_{x,\hat{y}}^{(k)} + 2C_L\lambda & \text{if } R(\lambda\mid\Theta, D_L) > 0 \\ 0 & \text{otherwise} \end{cases} \quad (48)$$

If $R(\lambda\mid\Theta, D_L)=0$, $L(\lambda\mid\Theta, D_L)$ cannot be differentiated. This means that $L(\lambda\mid\Theta, D_L)$ cannot be optimized by a normal gradient method. The optimization of $L(\lambda\mid\Theta, D_L)$ can be provided by using a subgradient method.

Figure 19:
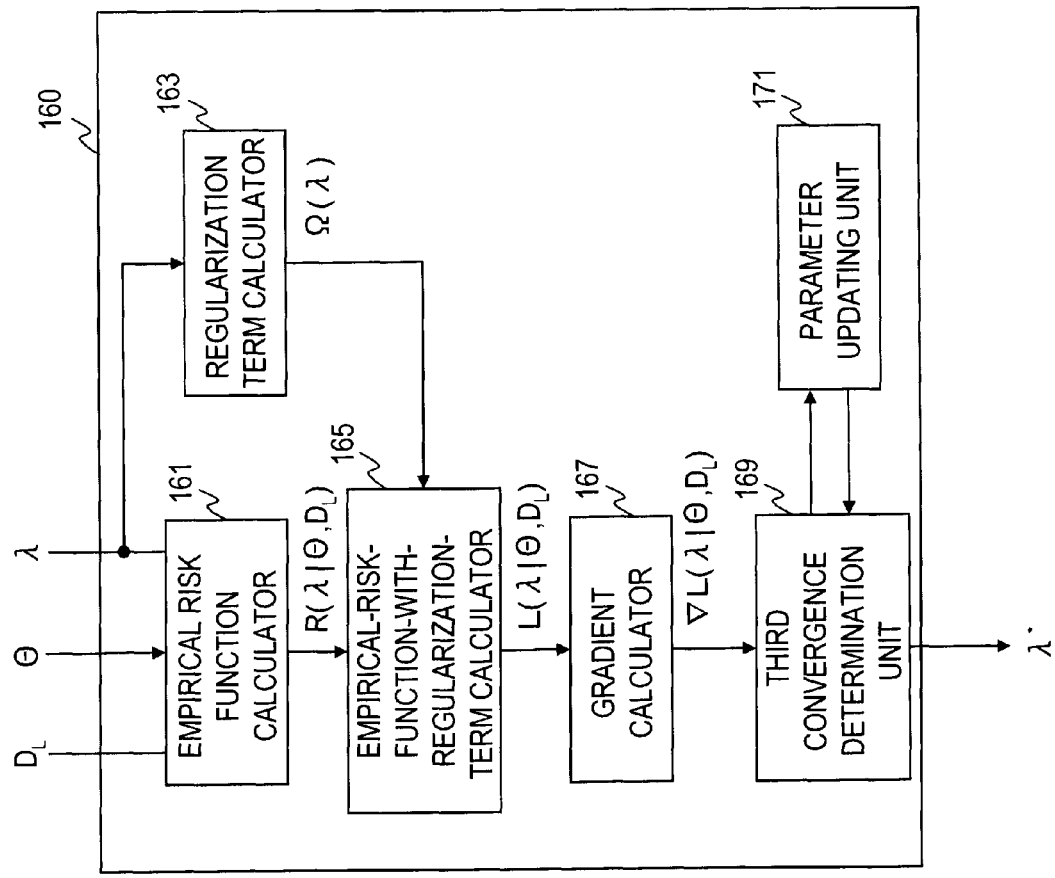
FIG. 19 is a functional block diagram of a base-model parameter estimating unit 160.
Figure 20:
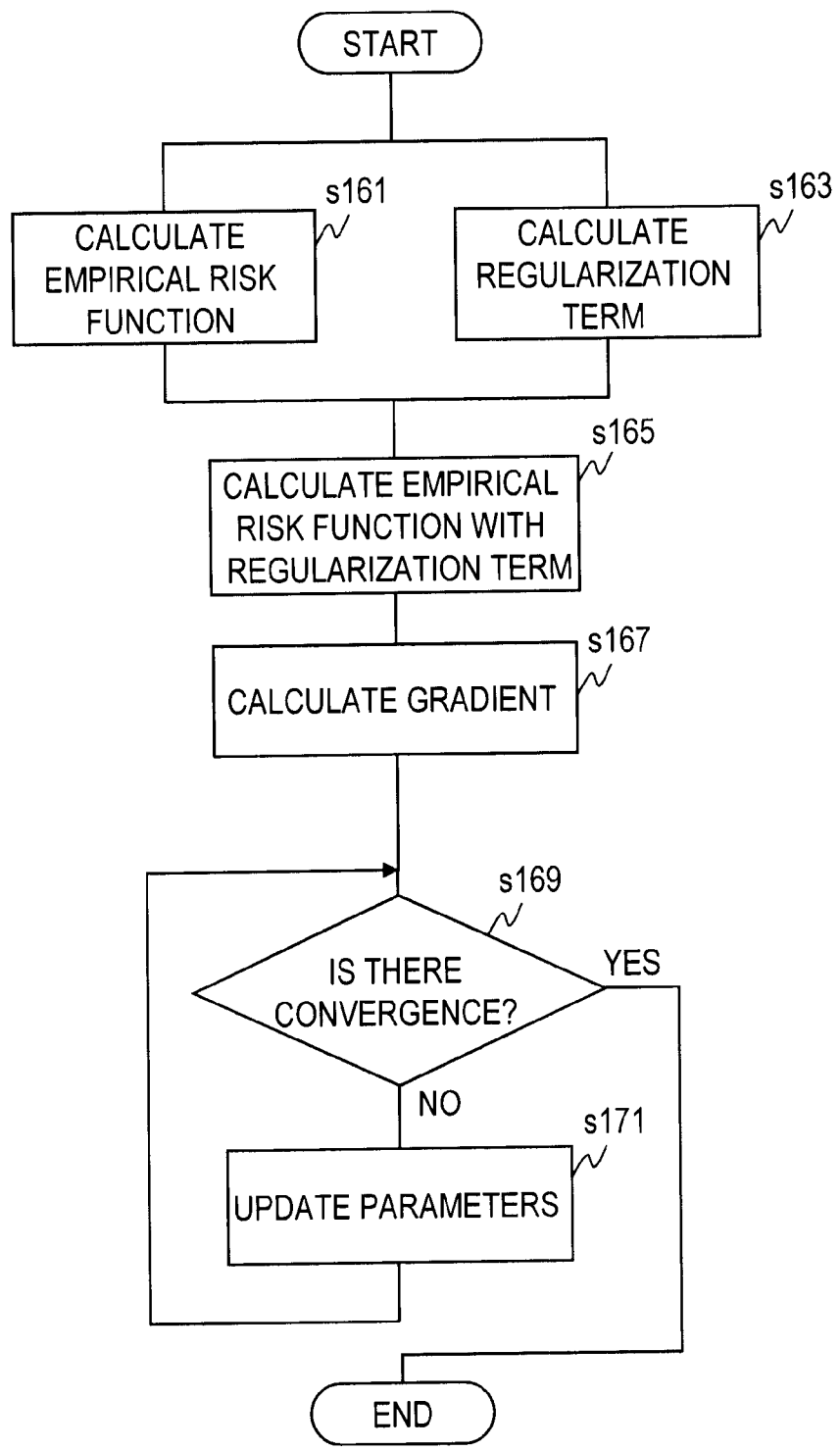
FIG. 20 is a flowchart of processing in the base-model parameter estimating unit 160.

Configuration of the Base-model Parameter Estimating Unit 160 and Processing Flow The base-model parameter estimating unit 160 will be described with reference to FIGS. 19 and 20. To estimate the base-model parameter set $\lambda$ in the conditional random field (refer to reference literature 1), the base-model parameter estimating unit 160 includes an empirical risk function calculator 161, a regularization term calculator 163, an empirical-risk-function-with-regularization-term calculator 165, a gradient calculator 167, a third convergence determination unit 169, and a parameter updating unit 171, as shown in FIG. 19.

The empirical risk function calculator 161 receives the supervised data $D_L$, the set $\Theta$ of auxiliary model parameter sets, and the base-model parameter set $\lambda$, and calculates the empirical risk function $R(\lambda\mid\Theta, D_L)$ of Equation (43) or (47) (s161). The empirical risk function calculator 161 outputs $R(\lambda\mid\Theta, D_L)$ to the empirical-risk-function-with-regularization-term calculator 165.

The regularization term calculator 163 receives the base-model parameter set $\lambda$, and calculates the regularization term $\Omega(\lambda)$ of Equation (42) (s163). The regularization term calculator 163 outputs $\Omega(\lambda)$ to the empirical-risk-function-with-regularization-term calculator 165.

The empirical-risk-function-with-regularization-term calculator 165 receives the empirical risk function $R(\lambda\mid\Theta, D_L)$ and the regularization term $\Omega(\lambda)$, substitutes them into Equation (41), and calculates the empirical risk function $L(\lambda\mid\Theta, D_L)$ with a regularization term (s165). The empirical-risk-function-with-regularization-term calculator 165 outputs the empirical risk function $L(\lambda\mid\Theta, D_L)$ with the regularization term to the gradient calculator 167.

To optimize the empirical risk function $L(\lambda\mid\Theta, D_L)$ with the regularization term, a gradient-based numerical optimization method such as L-BFGS can be used. L-BFGS is described in reference literature 2, and a description thereof will be omitted here.

The gradient calculator 167 calculates the gradient $\nabla L(\lambda\mid\Theta, D_L)$ of Equation (46) or (48) (s167).

The third convergence determination unit 169 determines whether the gradient $\nabla L(\lambda\mid\Theta, D_L)$ of Equation (46) or (48) has converged (s169). When it is determined that the value of the gradient $\nabla L(\lambda\mid\Theta, D_L)$ has converged, the third convergence determination unit 169 outputs the base-model parameter set $\lambda^*$ at that time to the first convergence determination unit 180.

If it is not determined that the value of the gradient $\nabla L(\lambda\mid\Theta, D_L)$ has converged, the parameter updating unit 171 updates the base-model parameter set $\lambda$ (s171).

First Convergence Determination Unit 180

The first convergence determination unit 180 receives the base-model parameter set $\lambda$ and the set $\Theta$ of auxiliary model parameter sets and determines whether the values have converged (s180). The convergence determination unit in what is claimed below corresponds to the first convergence determination unit 180.

The first convergence determination unit 180 makes the determination by using an increment of a parameter, for example. If the value of $|\lambda^{(t)}-\lambda^{(t+1)}|+|\Theta^{(t)}-\Theta^{(t+1)}|$ becomes a threshold or below, the first convergence determination unit 180 determines that the values have converged. The first convergence determination unit 180 may also determine that convergence has been made when a repetition count t reaches a predetermined repetition count T (t=T).

If it is determined that convergence has not been reached, the first convergence determination unit 180 outputs to the auxiliary model parameter estimating unit 140 a control signal c to repeat the processing to estimate the set $\Theta$ of auxiliary model parameter sets and the base-model parameter set $\lambda$. The first convergence determination unit 180 increments the parameter t, indicating the repetition count, by 1 (t←t+1). The preceding base-model $P(x, y; \lambda^{t-1}, \Theta^{t-1})$ in the repeated processing may be output as the reference function $\hat{r}$.

When it is determined that convergence has been reached, the first convergence determination unit 180 outputs the set $\Theta$ of auxiliary model parameter sets and the base-model parameter set $\lambda$, to the parameter integrating unit 190.

Parameter Integrating Unit 190

The parameter integrating unit 190 integrates the base-model parameter set $\lambda$ and the set $\Theta$ of auxiliary model parameter sets converged (s190).

Figure 21:
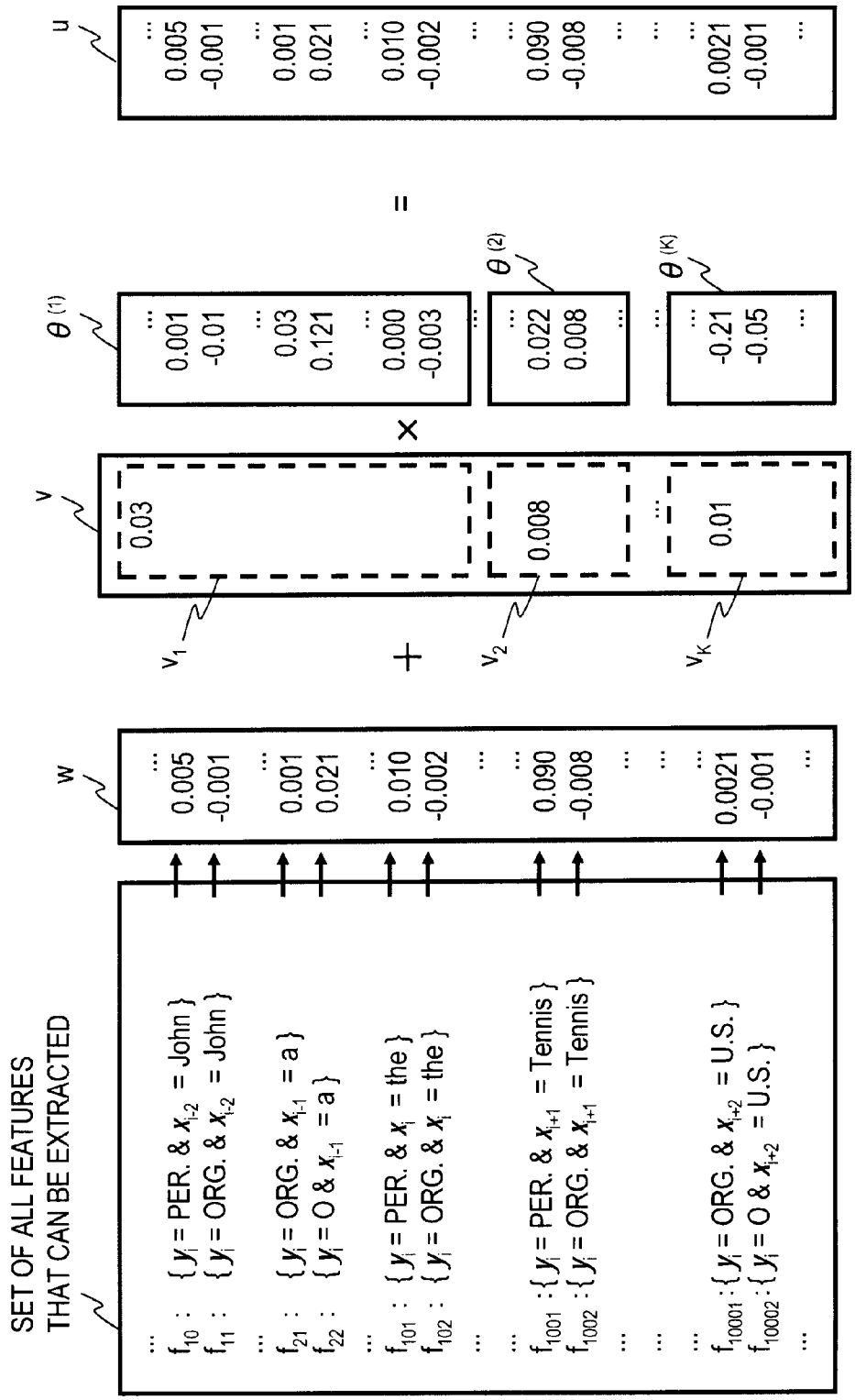
FIG. 21 shows data examples for a parameter set u with respect to the English-language input structure.

If the j-th feature of the base-model matches the p-th feature of the k-th auxiliary model, the parameter integrating unit 190 obtains the i-th element $u_i$ of the integrated parameter set u, as given by the equation below. FIG. 21 shows data examples of the parameter set u.

$$u_i = w_j + v^k \theta^{(k)}_p \quad (51)$$

If only the base-model has a feature corresponding to the i-th element $u_i$, the parameter integrating unit 190 obtains the element $u_i$ as given by the equation below.

$$u_i = w_j \quad (52)$$

If only the auxiliary model has a feature corresponding to the i-th element $u_i$, the element $u_i$ is obtained as given by the equation below.

$$u_i = v^k \theta^{(k)}_p \quad (53)$$

The structured prediction model can be expressed by the equation given below, instead of Equation (1).

$$\hat{y} = \arg\max_{y \in Y(x)} d(x, y; u) \quad (1)''$$

If the number of elements of the parameter set u is I when the base-model parameter set $\lambda$ and the set $\Theta$ of auxiliary model parameter sets are integrated, the parameter set u is expressed by $u = \{u_1, u_2, \ldots, u_I\}$.

The parameter integrating unit 190 outputs the integrated parameter set u, or a structured prediction model expressed by using the parameter set u, to the structured prediction model memory 6. In this embodiment, many of $\theta^{(k)}_1$ are zero (the parameters are not active). In this state, $u_i$ obtained by Equation (52) is also a zero parameter.

Effects

With this configuration, an inactive parameter (a zero parameter, in other words) and a feature corresponding to the parameter are deleted from the learned structured prediction model, and the memory space required to store the learned structured prediction model can be reduced. The structured prediction data created in accordance with the supervised data and unsupervised data maintain high prediction performance, but the memory space required to store it is reduced. The experimental results will be described later. Since the cost of generating the supervised data $D_L$ is high, not so many elements are obtained from the supervised data $D_L$, as elements of the base-model parameter set. On the other hand, a great number of elements can be obtained easily from the unsupervised data $D_U$, as elements of the set $\Theta$ of auxiliary model parameter sets. By making most of the elements of the set $\Theta$ to zero, the required memory space can be saved.

Hardware Configuration

Figure 22:
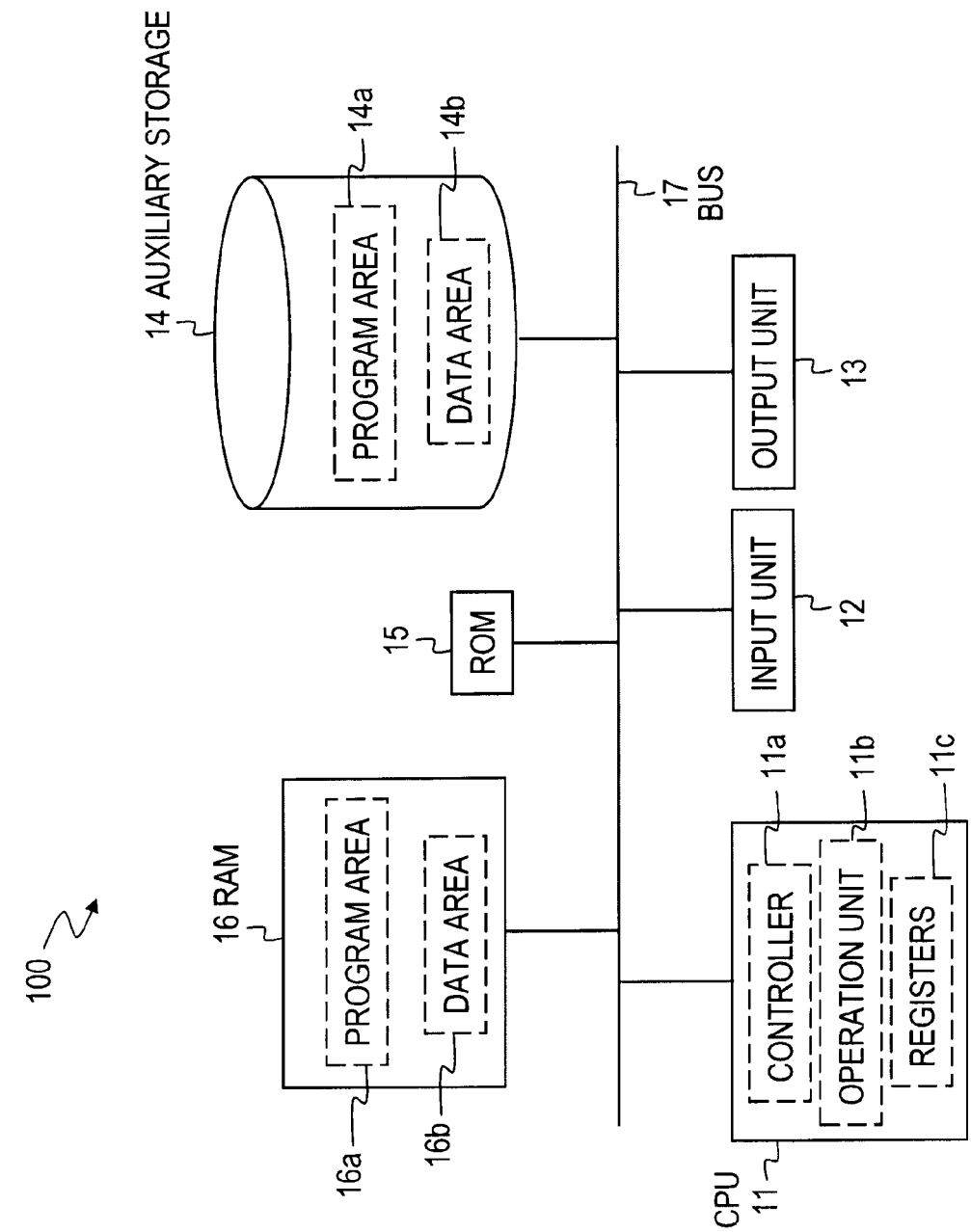
FIG. 22 is a block diagram of an example hardware structure of the structured prediction model learning apparatus 100.

FIG. 22 is a block diagram showing the hardware configuration of the structured prediction model learning apparatus 100 in this embodiment. As shown in FIG. 22, the structured prediction model learning apparatus 100 includes a central processing unit (CPU) 11, an input unit 12, an output unit 13, an auxiliary storage 14, a read-only memory (ROM) 15, a random access memory (RAM) 16, and a bus 17.

The CPU 11 includes a controller 11a, an operation unit 11b, and registers 11c and executes a variety of operations in accordance with programs read into the registers 11c. The input unit 12 is an input interface, a keyboard, a mouse, or the like, by which data is input, and the output unit 13 is an output interface, a display unit, a printer, or the like, by which data is output. The auxiliary storage 14 is a hard disk drive, a semiconductor memory, or the like and stores various data and programs for operating a computer as the structured prediction model learning apparatus 100. The programs and data are expanded in the RAM 16 and used by the CPU 11 or the like. The bus 17 connects the CPU 11, the input unit 12, the output unit 13, the auxiliary storage 14, the ROM 15, and the RAM 16 to allow communication among them. Examples of hardware of that type include a personal computer, a server apparatus, and a workstation.

Program Configuration

The auxiliary storage 14 stores programs to execute all types of processing in the structured prediction model learning apparatus 100 in this embodiment, as described above. Each program constituting a structured prediction program may be written as a single program sequence, and some of the programs may be stored as separate modules in a library.

Cooperation Between Hardware and Programs

The CPU 11 loads and expands the program or data read from the auxiliary storage 14 into the RAM 16, in accordance with the read OS program. The addresses of locations in the RAM 16 where the programs and data are written are stored in the registers 11c of the CPU 11. The controller 11a of the CPU 11 reads the addresses stored in the registers 11c successively, reads the programs and data from the corresponding locations in the RAM 16, has the operation unit 11b execute the operation indicated by the programs, and stores the results of operation in the registers 11c.

Figure 5:
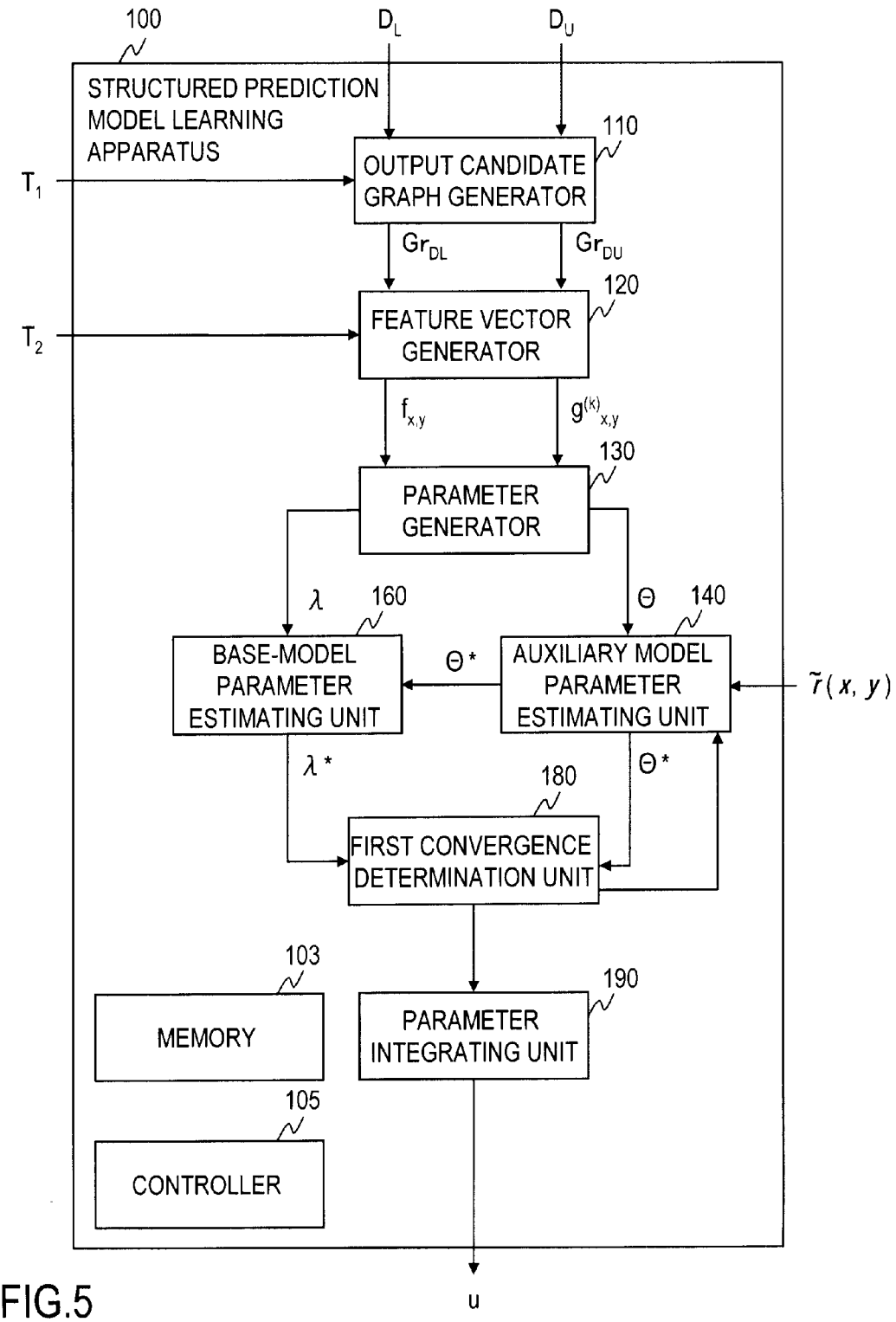
FIG. 5 is a functional block diagram of the structured prediction model learning apparatus 100.
Figure 6:
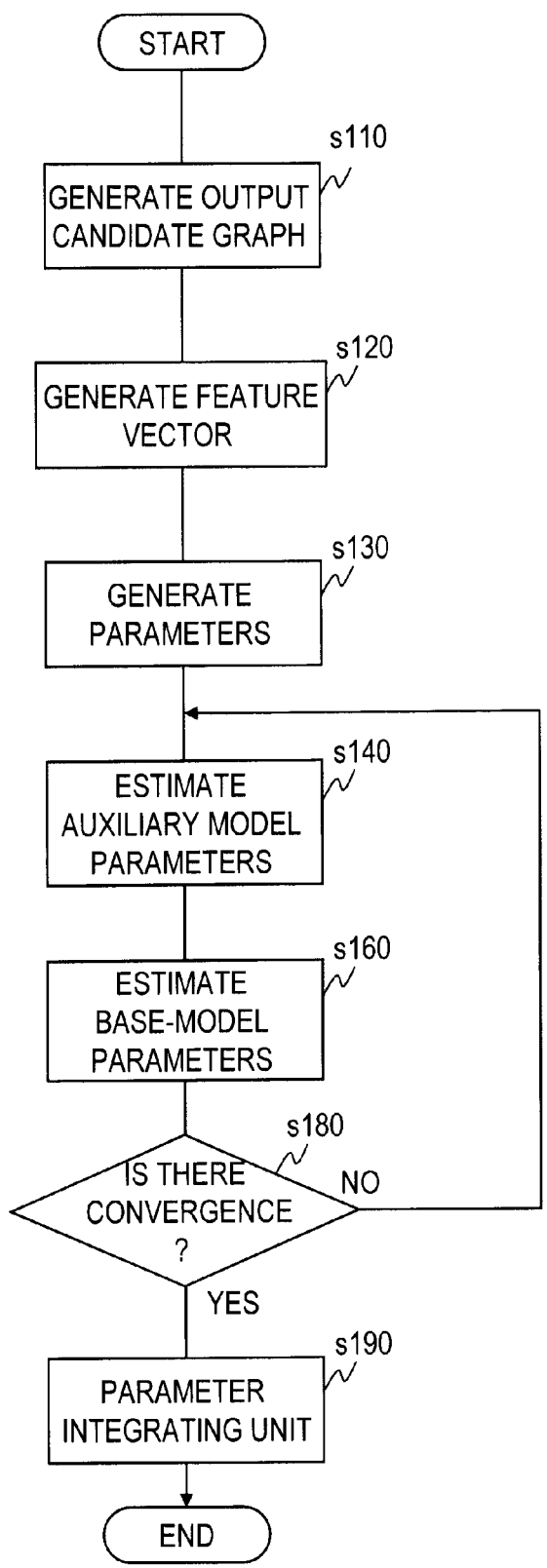
FIG. 6 is a flowchart of processing in the structured prediction model learning apparatus 100.

FIG. 5 is a block diagram showing an example functional configuration of the structured prediction model learning apparatus 100 implemented by executing the programs read in the CPU 11.

The memory 103 is any of the auxiliary storage 14, the RAM 16, the registers 11c, and other types of buffers, cache memories, and the like or is a storage area using some of them. The output candidate graph generator 110, the feature vector generator 120, the parameter generator 130, the auxiliary model parameter estimating unit 140, the base-model parameter estimating unit 160, the first convergence determination unit 180, and the parameter integrating unit 190 are implemented by executing the structured prediction program by the CPU 11.

Results of Experiment

Figure 23:
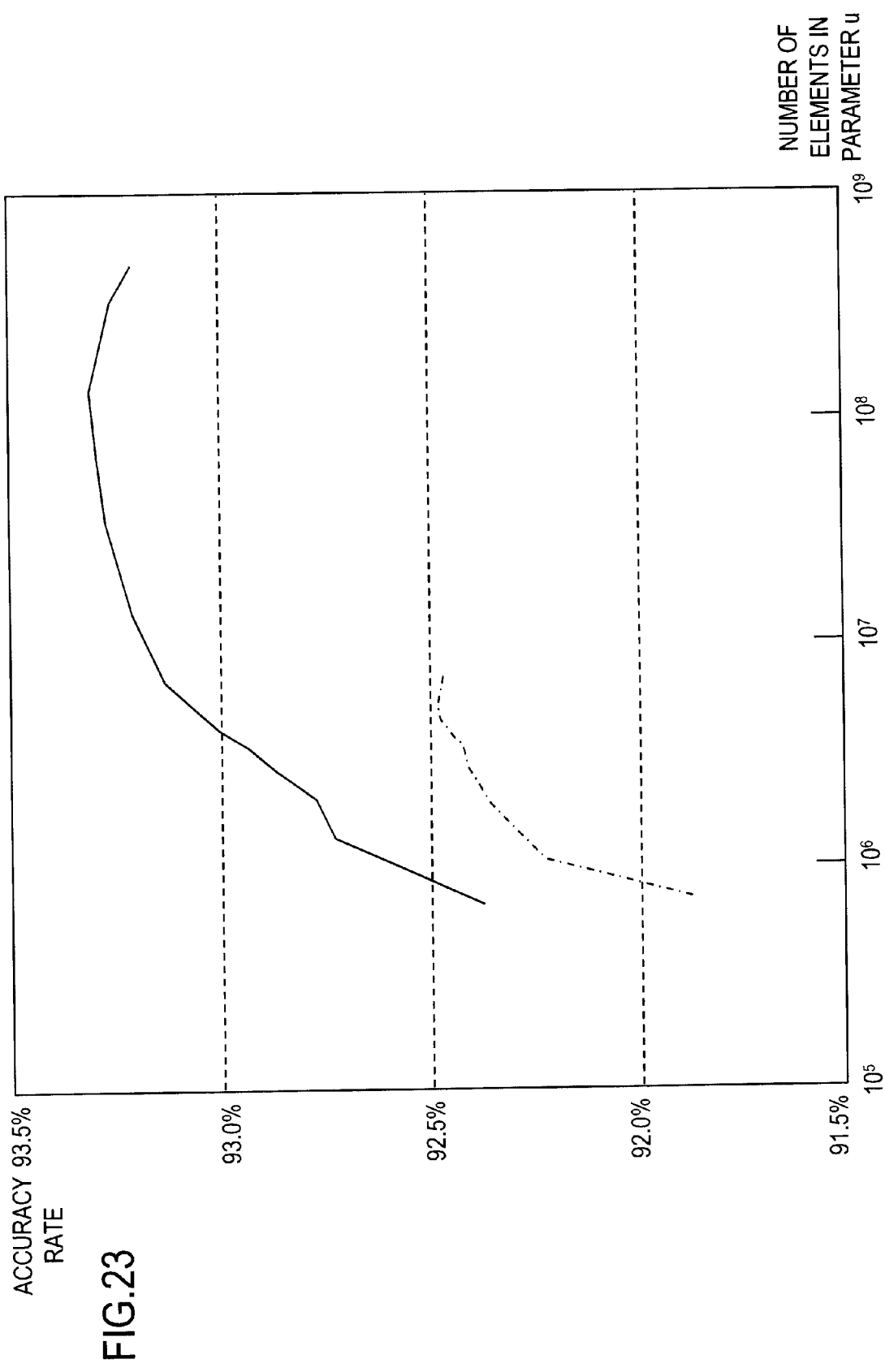
FIG. 23 is a graph showing the accuracy rate of the structured prediction system using a structured prediction model learned based on the supervised data only and the accuracy rate of the structured prediction system using a structured prediction model learned by the structured prediction model learning apparatus 100 employing auxiliary models of type 3.

In FIG. 23, the chain line represents the accuracy rate of the structured prediction system using a structured prediction model learned from the supervised data alone, and the solid line represents the accuracy rate of the structured prediction system using a structured prediction model learned by the structured prediction model learning apparatus 100 using auxiliary models of type 3. The accuracy rate of the structured prediction system using the structured prediction model learned by the structured prediction model learning apparatus 100 is higher, irrespective of the number of elements in the parameter. At an accuracy rate less than 92.5%, the number of elements in the parameter set u used in the structured prediction model learned by the structured prediction model learning apparatus 100 is about one tenth of the number of elements in the parameter set used in the structured prediction model learned from the supervised data alone.

Modification

The structured prediction model learning apparatus 100, the learning support information memory 4, the structured prediction model memory 6, and the structured prediction system 7 may be combined and implemented on a single computer.

Figure 24:
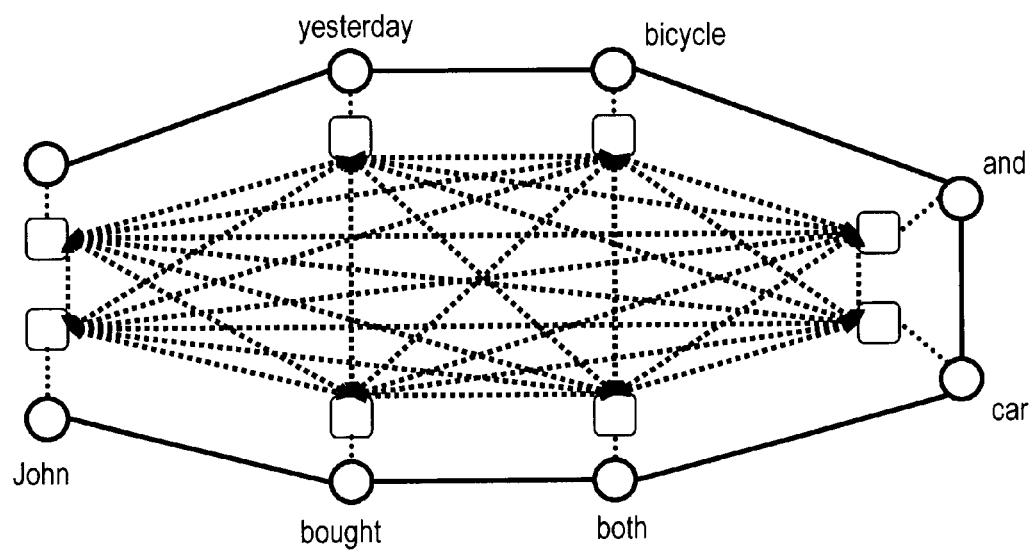
FIG. 24 shows an example output candidate graph for an English-language linking structure prediction problem.

The structured prediction model learning apparatus 100 can be used for a problem other than sequence structured prediction problems, if the set of output candidate definition data and the feature extraction template are changed to ones suitable for the problem. FIG. 24 shows output candidate graphs for linking structure prediction problems.

The feature vector generator 120 may combine a set of features extracted from the supervised-data output candidate graph $Gr_{DL}$ and a set of features extracted from the unsupervised-data output candidate graph $Gr_{DU}$. The feature vector generator 120 deletes identical features from the combined feature set and generates a common feature set. The base-model feature vector $f_{x,y}$ is a D-dimensional vector that includes elements in one-to-one correspondence with the elements of the common feature set. The auxiliary model feature vector $g^{(k)}_{x,y}$ is a $D_k$-dimensional vector that includes elements in one-to-one correspondence with the elements of a subset of the common feature set. The subset is obtained by dividing the common feature set into K parts. The degrees of the vectors are $D=D_1+D_2+\ldots+D_{DK}$. In this case, the parameter integrating unit 190 uses just Equation (51).

The auxiliary model parameter estimating unit 140 estimates a set of auxiliary model parameter sets which minimizes the empirical generalized relative entropy $U(\Theta|D_U)$ with the regularization term, by using the gradient of the empirical generalized relative entropy $U(\Theta|D_U)$ with the regularization term expressed by Equation (24), (26), (28), (30), (32), or (34). This estimation may be made by another method that does not use the gradient. The base-model parameter estimating unit 160 estimates a base-model parameter set that minimizes the empirical risk function $L(\lambda|\Theta, D_L)$ with the regularization term, by using the gradient of the empirical risk function $L(\lambda|\Theta, D_L)$ with the regularization term expressed by Equation (41). This estimation may be made by another method that does not use the gradient.

What is claimed is:

1. A structured prediction model learning apparatus, having a central processing unit, for learning a structured prediction model used to predict an output structure y corresponding to an input structure x, by using supervised data $D_L$ and unsupervised data $D_U$, the structured prediction model learning apparatus comprising:

an output candidate graph generator implemented by the central processing unit to generate a supervised data output candidate graph for the supervised data and an unsupervised data output candidate graph for the unsupervised data, by using a set of definition data for generating output candidates identified by a structured prediction problem;

a feature vector generator extracting features from the supervised data output candidate graph and the unsupervised data output candidate graph by using a feature extraction template, generating a D-dimensional base-model feature vector $f_{x,y}$ corresponding to a set of the features extracted from the supervised data output candidate graph, dividing a set of the features extracted from the unsupervised data output candidate graph into K subsets, and generating a $D_k$-dimensional auxiliary model feature vector $g^{(k)}_{x,y}$ corresponding to features included in a subset k of the K subsets, where K is a natural number and $k \in \{1, 2, \ldots, K\}$;

a parameter generator generating a base-model parameter set $\lambda$ which includes a first parameter set w formed of D first parameters in one-to-one correspondence with D elements of the base-model feature vector $f_{x,y}$, generating an auxiliary model parameter set $\theta^{(k)}$ formed of $D_k$ auxiliary model parameters in one-to-one correspondence with $D_k$ elements of the auxiliary model feature vector $g^{(k)}_{x,y}$, and to generate a set $\Theta=\{\theta^{(1)}, \theta^{(2)}, \ldots, \theta^{(K)}\}$ of auxiliary model parameter sets, formed of K auxiliary model parameter sets $\theta^{(k)}$;

an auxiliary model parameter estimating unit estimating the set $\Theta$ of auxiliary model parameter sets which minimizes the Bregman divergence having a regularization term obtained from the auxiliary model parameter set $\theta^{(k)}$, between each auxiliary model $q_k$ and a reference function $\tilde{r}(x,y)$ which is a nonnegative function and indicates the degree of pseudo accuracy of the output structure y corresponding to the input structure x, by using the regularization term and the unsupervised data $D_U$, where the auxiliary model $q_k$ is obtained by defining the auxiliary model parameter set $\theta^{(k)}$ with a log-linear model; and a base-model parameter estimating unit estimating a base-model parameter set $\lambda$ which minimizes an empirical risk function defined beforehand, by using the supervised data $D_L$ and the set $\Theta$ of auxiliary model parameter sets, where the base-model parameter set $\lambda$ includes a second parameter set $v=\{v_1, v_2, \ldots, v_K\}$ formed of K second parameters in one-to-one correspondence with K auxiliary models;

wherein the auxiliary model parameter estimating unit uses the auxiliary model parameter set $\theta^{(k)}$ to obtain an $L_1$ norm regularization term $|\theta^{(k)}|_1$, obtains the Bregman divergence having the regularization term as the following empirical generalized relative entropy having a regularization term $$U(\Theta \mid D_U) = C_U \sum_k |\theta^{(k)}|_1 + \sum_k \hat{G}_{D_U}(\tilde{r} \| q_k)$$

where $C_u$ is a hyper parameter and $\hat{G}_{D_U}(\tilde{r}\|q_k)$ is a generalized relative entropy obtained by using the unsupervised data $D_U$, and estimates the set $\Theta$ of auxiliary model parameter sets which minimizes the empirical generalized relative entropy having the regularization term.

2. The structured prediction model learning apparatus according to claim 1, further comprising:

a convergence determination unit determining whether the values of the base-model parameter set $\lambda$, and the set $\Theta$ of auxiliary model parameter sets have converged; and a parameter integrating unit integrating the converged base-model parameter set $\lambda$ and the converged set $\Theta$ of auxiliary model parameter sets;

wherein, in a case where the convergence determination unit determines that the values of the base-model parameter set $\lambda$ and the set $\Theta$ of auxiliary model parameter sets have not converged, the auxiliary model parameter estimating unit repeatedly estimates the set $\Theta$ of auxiliary model parameter sets, and the base-model parameter estimating unit repeatedly estimates the base-model parameter set $\lambda$; and the reference function $\tilde{r}$ is a base-model P used immediately before the current repetition of model parameter set estimation.

3. The structured prediction model learning apparatus according to claim 1, wherein the base-model parameter estimating unit uses a regularization term $\Omega(\lambda)$ obtained from the base-model parameter set $\lambda$ to obtain the empirical risk function as the following empirical risk function having a regularization term $$L(\lambda|\Theta, D_L) = R(\lambda|\Theta, D_L) + C_L \Omega(\lambda)$$

where $C_L$ is a hyper parameter;
in a case where a negative log likelihood is used as the empirical risk function, the following is used $$R(\lambda \mid \Theta, D_l) = -\sum_{(x,y) \in D_L} \log \frac{\exp[d(x, y; \lambda, \Theta)]}{\sum_y \exp[d(x, y; \lambda, \Theta)]};$$

where $d(x, y; \lambda, \Theta)$ represents a discriminant function that returns a score indicating a likelihood of obtaining the output structure y with respect to the input structure x; and
in a case where a base-model parameter set $\lambda$ which minimizes $L(\lambda|\Theta, D_L)$ is estimated based on margin maximization in a linear identification model, the following are used $$R(\lambda \mid \Theta, D_L) = \sum_{(x,y) \in D_L} \max[0, E(y, \hat{y}) - d(x, y; \lambda, \Theta) + d(x, \hat{y}; \lambda, \Theta)]$$

$$\hat{y} = \arg\max_{y' \in Y(x) \setminus y} d(x, y'; \lambda, \Theta) + E(y, y').$$

where $E(y, \hat{y})$ is a function expressing the degree of error for $\hat{y}$ obtained by comparing a correct output y with a certain output $\hat{y}$ and $Y(x) \setminus y$ represents a difference set obtained by subtracting the output structure y corresponding to the input structure x from a set $Y(x)$ of all possible outputs with respect to x.

4. The structured prediction model learning apparatus according to claim 1, wherein the auxiliary model parameter estimating unit obtains the empirical generalized relative entropy having the regularization term as one of the following, where the conditional probability of outputting the output structure y in a case where the input structure x is given is $q^1_k(y|x; \theta^{(k)})$ and the odds of $q^1_k$ are $q'^1_k$, $$U(\Theta \mid D_U) = C_U \sum_k |\theta^{(k)}|_1 + \sum_k \hat{K}_{D_U}(\tilde{r}(x, y) \| q^1_k(y \mid x; \theta^{(k)}))$$

$$= C_U \sum_k |\theta^{(k)}|_1 - \sum_k \sum_{x \in D_U} \sum_y$$

$$\tilde{r}(x, z)[\theta^{(k)}_n \cdot g^{(k)}_{x,z,n}] +$$

$$\sum_k \sum_{x \in D_U} \sum_y \log[b(y) + \exp[\theta^{(k)} \cdot g^{(k)}_{x,y}]] + const(\theta^{(k)}_n)$$

and $$U(\Theta \mid D_U) = C_U \sum_k |\theta^{(k)}|_1 + \sum_k \hat{K}_{D_U}(\tilde{r}(x, y) \| q'^1_k(y \mid x; \theta^{(k)}))$$

$$= C_U \sum_k |\theta^{(k)}|_1 - \sum_k \sum_{x \in D_U} \sum_y$$

$$\tilde{r}(x, z)[\theta^{(k)}_n \cdot g^{(k)}_{x,z,n}] +$$

$$\sum_k \sum_{x \in D_U} \sum_y q'^1_k(z \mid x, n; \theta^{(k)}_n) + const(\theta^{(k)}_n)$$

where $b(y)$ is a function that returns a value more or equals to 1 and $const(\theta^{(k)})$ is a collective value of constant terms with respect to $\theta^{(k)}$; and the auxiliary model parameter estimating unit estimates the set $\Theta$ of auxiliary model parameter sets which minimizes the empirical generalized relative entropy.

5. The structured prediction model learning apparatus according to claim 1, wherein the auxiliary model parameter estimating unit obtains the empirical generalized relative entropy having the regularization term as one of the following, where the conditional probability of outputting a local structure z in the output structure y in a case where the input structure x is given is $q^2_k(z|x; \theta^{(k)})$ and the odds of $q^2_k$ are $q'^2_k$, $$U(\Theta \mid D_U) = C_U \sum_k |\theta^{(k)}|_1 + \sum_k \hat{K}_{D_U}(\tilde{r}(x, z) \| q^2_k(z \mid x, n; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta^{(k)}_n \cdot g^{(k)}_{x,z,n}] + \sum_k \sum_{x \in D_U} \sum_{z \in Z(x, Y(x))}$$

$$\log[b(y) + \exp[\theta^{(k)} \cdot g^{(k)}_{x,y}]] + const(\theta^{(k)}_n)$$

and $$U(\Theta \mid D_U) = C_U \sum_k |\theta^{(k)}|_1 + \sum_k \hat{K}_{D_U}(\tilde{r}(x, y) \| q'^2_k(y \mid x; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta^{(k)}_n \cdot g^{(k)}_{x,z,n}] +$$

$$\sum_k \sum_{x \in D_U} \sum_{z \in Z(x, Y(x))} q'^2_k(z \mid x, n; \theta^{(k)}) + const(\theta^{(k)})$$

where $b(z)$ represents the number of local structures that are rival candidates of the local structure z and $const(\theta^{(k)})$ is a collective value of constant terms with respect to $\theta^{(k)}$; and
the auxiliary model parameter estimating unit estimates the set $\Theta$ of auxiliary model parameter sets which minimizes the empirical generalized relative entropy.

6. The structured prediction model learning apparatus according to claim 1, wherein the auxiliary model parameter estimating unit obtains the empirical generalized relative entropy having the regularization term as one of the following, where the conditional probability of outputting a local structure z having a feature n in the output structure y in a case where the input structure x is given is $q^3_k(z|x, n; \theta^{(k)})$ and the odds of $q^3_k$ are $q'^3_k$, $$U(\Theta \mid D_U) = C_U \sum_k |\theta^{(k)}|_1 + \sum_k \hat{K}_{D_U}(\tilde{r}(x, z) \| q^3_k(z \mid x, n; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta^{(k)}_n \cdot g^{(k)}_{x,z,n}] + \sum_k \sum_{x \in D_U} \sum_{z \in Z(x, Y(x))}$$

$$\log[b(y) + \exp[\theta^{(k)} \cdot g^{(k)}_{x,y}]] + const(\theta^{(k)}_n)$$

and $$U(\Theta \mid D_U) = C_U \sum_k |\theta^{(k)}|_1 + \sum_k \hat{K}_{D_U}(\tilde{r}(x, y) \| q'^3_k(y \mid x; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta^{(k)}_n \cdot g^{(k)}_{x,z,n}] +$$

$$\sum_k \sum_{x \in D_U} \sum_{z \in Z(x, Y(x))} q'^3_k(z \mid x, n; \theta^{(k)}) + const(\theta^{(k)}_n)$$

where n=1, 2, ..., $D_k$, $\theta^{(k)} = (\theta^{(k)}_1, \theta^{(k)}_2, ..., \theta^{(k)}_{Dk})$, $g^{(k)}_{x,z} = (g^{(k)}_{x,z,1}, g^{(k)}_{x,z,2}, ..., g^{(k)}_{x,z,Dk})$, b(z) represents the number of local structures that are rival candidates of the local structure z and const($\theta^{(k)}_n$) is a collective value of constant terms with respect to $\theta^{(k)}_n$; and the auxiliary model parameter estimating unit estimates the set $\Theta$ of auxiliary model parameter sets which minimizes the empirical generalized relative entropy.

7. A structured prediction model learning method for learning a structured prediction model used to predict an output structure y corresponding to an input structure x, by using supervised data $D_L$ and unsupervised data $D_U$, the structured prediction model learning method comprising:

an output candidate graph generating step of generating a supervised data output candidate graph for the supervised data and an unsupervised data output candidate graph for the unsupervised data, by using a set of definition data for generating output candidates identified by a structured prediction problem;

a feature vector generating step of extracting features from the supervised data output candidate graph and the unsupervised data output candidate graph by using a feature extraction template, generating a D-dimensional base-model feature vector $f_{x,y}$ corresponding to a set of the features extracted from the supervised data output candidate graph, dividing a set of the features extracted from the unsupervised data output candidate graph into K subsets, and generating a $D_k$-dimensional auxiliary model feature vector $g^{(k)}_{x,y}$ corresponding to features included in a subset k of the K subsets, where K is a natural number and k∈{1, 2, ..., K};

a parameter generating step of generating a base-model parameter set λ which includes a first parameter set w formed of D first parameters in one-to-one correspondence with D elements of the base-model feature vector $f_{x,y}$, generating an auxiliary model parameter set $\theta^{(k)}$ formed of $D_k$ auxiliary model parameters in one-to-one correspondence with $D_k$ elements of the auxiliary model feature vector $g^{(k)}_{x,y}$, and generating a set $\Theta = \{\theta^{(1)}, \theta^{(2)}, ..., \theta^{(K)}\}$ of auxiliary model parameter sets, formed of K auxiliary model parameter sets $\theta^{(k)}$;

an auxiliary model parameter estimating step of estimating the set $\Theta$ of auxiliary model parameter sets which minimizes the Bregman divergence having a regularization term obtained from the auxiliary model parameter set $\theta^{(k)}$, between each auxiliary model $q_k$ and a reference function $\tilde{r}(x, y)$ which is a nonnegative function and indicates the degree of pseudo accuracy of the output structure y corresponding to the input structure x, by using the regularization term and the unsupervised data $D_U$, where the auxiliary model $q_k$ is obtained by defining the auxiliary model parameter set $\theta^{(k)}$ with a log-linear model; and a base-model parameter estimating step of estimating a base-model parameter set λ which minimizes an empirical risk function defined beforehand, by using the supervised data $D_L$ and the set $\Theta$ of auxiliary model parameter sets, where the base-model parameter set λ includes a second parameter set $v = \{v_1, v_2, ..., v_K\}$ formed of K second parameters in one-to-one correspondence with K auxiliary models;

wherein, in the auxiliary model parameter estimating step, the auxiliary model parameter set $\theta^{(k)}$ is used to obtain an $L_1$ norm regularization term $|\theta^{(k)}|_1$, the Bregman divergence having the regularization term is obtained as the following empirical generalized relative entropy having a regularization term $$U(\Theta | D_U) = C_U \sum_k |\theta^{(k)}|_1 + \sum_k \hat{G}_{D_U}(\tilde{r} \| q_k)$$

where $C_U$ is a hyper parameter and $\hat{G}_{D_U}(\tilde{r}\|q_k)$ is a generalized relative entropy obtained by using the unsupervised data $D_U$, and the set $\Theta$ of auxiliary model parameter sets which minimizes the empirical generalized relative entropy having the regularization term is estimated.

8. The structured prediction model learning method according to claim 7, further comprising:

a convergence determination step of determining whether the values of the base-model parameter set λ and the set $\Theta$ of auxiliary model parameter sets have converged; and a parameter integrating step of integrating the converged base-model parameter set λ and the converged set $\Theta$ of auxiliary model parameter sets;

wherein, in a case where it is determined in the convergence determination step that the values of the base-model parameter set λ and the set $\Theta$ of auxiliary model parameter sets have not converged, the set $\Theta$ of auxiliary model parameter sets is repeatedly estimated in the auxiliary model parameter estimating step and the base-model parameter set λ is repeatedly estimated in the base-model parameter estimating step; and the reference function $\tilde{r}$ is a base-model P used immediately before the current repetition of model parameter set estimation.

9. The structured prediction model learning method according to claim 7, wherein, in the base-model parameter estimating step, a regularization term $\Omega(\lambda)$ obtained from the base-model parameter set λ is used to obtain the empirical risk function as the following empirical risk function having a regularization term $$L(\lambda|\Theta, D_L) = R(\lambda|\Theta, D_L) + C_L \Omega(\lambda)$$

where $C_L$ is a hyper parameter;

in a case where a negative log likelihood is used as the empirical risk function, the following is used $$R(\lambda | \Theta, D_l) = -\sum_{(x,y) \in D_L} \log \frac{\exp[d(x, y; \lambda, \Theta)]}{\sum_y \exp[d(x, y; \lambda, \Theta)]};$$

where $d(x, y; \lambda\Theta)$ represents a discriminant function that returns a score indicating a likelihood of obtaining the output structure y with respect to the input structure x; and in a case where a base-model parameter set λ which minimizes $L(\lambda|\Theta, D_L)$ is estimated based on margin maximization in a linear identification model, the following are used $$R(\lambda | \Theta, D_L) = \sum_{(x,y) \in D_L} \max[0, E(y, \hat{y}) - d(x, y; \lambda, \Theta) + d(x, \hat{y}; \lambda, \Theta)]$$

$$\hat{y} = \arg\max_{y' \in Y(x) \backslash y} d(x, y'; \lambda, \Theta) + E(y, y').$$

where $E(y, \tilde{y})$ is a function expressing the degree of error for $\tilde{y}$ obtained by comparing a correct output y with a certain output $\tilde{y}$ and $Y(x) \backslash y$ represents a difference set obtained by subtracting the output structure y corresponding to the input structure x from a set $Y(x)$ of all possible outputs with respect to x.

10. The structured prediction model learning method according to claim 7, wherein, in the auxiliary model parameter estimating step, the empirical generalized relative entropy having the regularization term is obtained as one of the following, where the conditional probability of outputting the output structure y in a case where the input structure x is given is $q^1_k(y|x; \theta^{(k)})$ and the odds of $q^1_k$ are $q'^1_k$, $$U(\Theta | D_U) = C_U \sum_k |\theta^{(k)}|_1 + \sum_k \hat{K}_{D_U}(\tilde{r}(x, y) \| q^1_k(y | x; \theta^{(k)}))$$

$$= C_U \sum_k |\theta^{(k)}|_1 - \sum_k \sum_{x \in D_U} \sum_y$$

$$\tilde{r}(x, z)[\theta_n^{(k)} \cdot g_{x,z,n}^{(k)}] +$$

$$\sum_k \sum_{x \in D_U} \sum_y \log[b(y) + \exp[\theta^{(k)} \cdot g_{x,y}^{(k)}]] + const(\theta_n^{(k)})$$

and $$U(\Theta | D_U) = C_U \sum_k |\theta^{(k)}|_1 + \sum_k \hat{K}_{D_U}(\tilde{r}(x, y) \| q'^1_k(y | x; \theta^{(k)}))$$

$$= C_U \sum_k |\theta^{(k)}|_1 - \sum_k \sum_{x \in D_U} \sum_y$$

$$\tilde{r}(x, z)[\theta_n^{(k)} \cdot g_{x,z,n}^{(k)}] +$$

$$\sum_k \sum_{x \in D_U} \sum_y q'^1_k(z | x, n; \theta_n^{(k)}) + const(\theta_n^{(k)})$$

where b(y) is a function that returns a value more or equals to 1 and $const(\theta^{(k)})$ is a collective value of constant terms with respect to $\theta^{(k)}$; and the set $\Theta$ of auxiliary model parameter sets which minimizes the empirical generalized relative entropy is estimated.

11. The structured prediction model learning method according to claim 7, wherein, in the auxiliary model parameter estimating step, the empirical generalized relative entropy having the regularization term is obtained as one of the following, where the conditional probability of outputting a local structure z in the output structure y in a case where the input structure x is given is $q^2_k(z|x; \theta^{(k)})$ and the odds of $q^2_k$ are $q'^2_k$, $$U(\Theta | D_U) = C_U \sum_k |\theta^{(k)}|_1 + \sum_k \hat{K}_{D_U}(\tilde{r}(x, z) \| q^2_k(z | x, n; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta_n^{(k)} \cdot g_{x,z,n}^{(k)}] + \sum_k \sum_{x \in D_U} \sum_{z \in Z(x, Y(x))}$$

$$\log[b(y) + \exp[\theta^{(k)} \cdot g_{x,y}^{(k)}]] + const(\theta_n^{(k)})$$

and $$U(\Theta | D_U) = C_U \sum_k |\theta^{(k)}|_1 + \sum_k \hat{K}_{D_U}(\tilde{r}(x, y) \| q'^2_k(y | x; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta_n^{(k)} \cdot g_{x,z,n}^{(k)}] +$$

$$\sum_k \sum_{x \in D_U} \sum_{z \in Z(x, Y(x))} q'^2_k(z | x, n; \theta^{(k)}) + const(\theta^{(k)})$$

where b(z) represents the number of local structures that are rival candidates of the local structure z and $const(\theta^{(k)})$ is a collective value of constant terms with respect to $\theta^{(k)}$; and the set $\Theta$ of auxiliary model parameter sets which minimizes the empirical generalized relative entropy is estimated.

12. The structured prediction model learning method according to claim 7, wherein, in the auxiliary model parameter estimating step, the empirical generalized relative entropy having the regularization term is obtained as one of the following, where the conditional probability of outputting a local structure z having a feature n in the output structure y in a case where the input structure x is given is $q^3_k(z|x, n; \theta^{(k)})$ and the odds of $q^3_k$ are $q'^3_K$ $$U(\Theta | D_U) = C_U \sum_k |\theta^{(k)}|_1 + \sum_k \hat{K}_{D_U}(\tilde{r}(x, z) \| q^3_k(z | x, n; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta_n^{(k)} \cdot g_{x,z,n}^{(k)}] + \sum_k \sum_{x \in D_U} \sum_{z \in Z(x, Y(x))}$$

$$\log[b(y) + \exp[\theta^{(k)} \cdot g_{x,y}^{(k)}]] + const(\theta_n^{(k)})$$

and $$U(\Theta | D_U) = C_U \sum_k |\theta^{(k)}|_1 + \sum_k \hat{K}_{D_U}(\tilde{r}(x, y) \| q'^3_k(y | x; \theta^{(k)}))$$

$$= C_U \sum_k |\theta^{(k)}|_1 - \sum_k \sum_{x \in D_U} \sum_{z \in Z(x, Y(x))}$$

$$\tilde{r}(x, z)[\theta_n^{(k)} \cdot g_{x,z,n}^{(k)}] +$$

$$\sum_k \sum_{x \in D_U} \sum_{z \in Z(x, Y(x))} q'^3_k(z | x, n; \theta^{(k)}) + const(\theta_n^{(k)})$$

$$U(\Theta | D_U) = C_U \sum_k |\theta^{(k)}|_1 + \sum_k \hat{K}_{D_U}(\tilde{r}(x, y) \| q'^3_k(y | x; \theta^{(k)})) +$$

$$\sum_k \sum_{x \in D_U} \sum_{z \in Z(x, Y(x))} \log[b(y) + \exp[\theta_n^{(k)} \cdot g_{x,z,n}^{(k)}]] + const(\theta_n^{(k)})$$

$$U(\Theta | D_U) = C_U \sum_k |\theta^{(k)}|_1 + \sum_k \hat{K}_{D_U}(\tilde{r}(x, y) \| q'^3_k(y | x; \theta^{(k)})) +$$

$$\sum_k \sum_{x \in D_U} \sum_{z \in Z(x, Y(x))} q'^3_k(z | x, n; \theta_n^{(k)}) + const(\theta_n^{(k)})$$

where $n=1, 2, \ldots, D_k$, $\theta^{(k)}=(\theta^{(k)}_1, \theta^{(k)}_2, \ldots, \theta^{(k)}_{Dk})$, $g^{(k)}_{x,z}=(g^{(k)}_{x,z,1}, g^{(k)}_{x,z,2}, \ldots, g^{(k)}_{x,z,Dk})$, b(z) represents the number of local structures that are rival candidates of the local structure z and $const(\theta^{(k)}_n)$ is a collective value of constant terms with respect to $\theta^{(k)}_n$; and the set $\Theta$ of auxiliary model parameter sets which minimizes the empirical generalized relative entropy is estimated.

13. A non-transitory computer-readable recording medium that records a program that makes a computer function as the structured prediction model learning apparatus according to claim 1.

* * * * *